US010536336B2

(12) United States Patent
Marriott et al.

(10) Patent No.: US 10,536,336 B2
(45) Date of Patent: *Jan. 14, 2020

(54) REMOTELY CONFIGURED MEDIA DEVICE

(71) Applicant: Apple Inc., Cupertino, CA (US)

(72) Inventors: Greg Marriott, Honolulu, HI (US); Andrew Bert Hodge, Palo Alto, CA (US)

(73) Assignee: Apple Inc., Cupertino, CA (US)

(*) Notice: Subject to any disclaimer, the term of this patent is extended or adjusted under 35 U.S.C. 154(b) by 278 days.

This patent is subject to a terminal disclaimer.

(21) Appl. No.: 13/761,698

(22) Filed: Feb. 7, 2013

(65) Prior Publication Data

US 2013/0174043 A1 Jul. 4, 2013

Related U.S. Application Data

(63) Continuation of application No. 13/296,089, filed on Nov. 14, 2011, now Pat. No. 8,396,948, which is a (Continued)

(51) Int. Cl.
*H04L 12/24* (2006.01)
*H04L 29/08* (2006.01)
*H04L 12/28* (2006.01)

(52) U.S. Cl.
CPC ........ *H04L 41/084* (2013.01); *H04L 12/2807* (2013.01); *H04L 41/0803* (2013.01);
(Continued)

(58) Field of Classification Search
CPC ...... G06F 3/1423; G06F 9/4443; G06F 9/542; G06F 17/30044; G06F 17/30053;
(Continued)

(56) References Cited

U.S. PATENT DOCUMENTS 4,090,216 A 5/1978 Constable
4,386,345 A 5/1983 Narveson et al.
(Continued)

FOREIGN PATENT DOCUMENTS

DE 43 34 773 A1 4/1994
DE 44 45 023 A1 6/1996
(Continued)

OTHER PUBLICATIONS

Apple iTunes Smart Playlists, downloaded Apr. 5, 2005 from http://web.archive.org/web/20031002011316/www.apple.com/itunes/smartplaylists . . . pp. 1-2.
(Continued)

*Primary Examiner* — Ramy M Osman
(74) *Attorney, Agent, or Firm* — Blank Rome LLP

(57) ABSTRACT

Improved techniques for controlling operation of a portable electronic device are disclosed. Portable electronic devices which interact with a host electronic device can have their operational settings (e.g., configurations or preferences) remotely controlled. As a result, a host electronic device can offer a more sophisticated user interface and portable electronic devices need less local user interface features because these operational settings can be remotely controlled. The remotely-controlled (i.e., host controlled) operational settings are transferred to the portable electronic devices, whereby the portable electronic devices can thereafter operate in accordance with such settings.

19 Claims, 7 Drawing Sheets

Related U.S. Application Data continuation of application No. 13/047,082, filed on Mar. 14, 2011, now Pat. No. 8,078,685, which is a continuation of application No. 11/583,327, filed on Oct. 18, 2006, now Pat. No. 7,930,369.

(60) Provisional application No. 60/728,671, filed on Oct. 19, 2005.

(52) U.S. Cl.
CPC ...... *H04L 41/0813* (2013.01); *H04L 41/0846* (2013.01); *H04L 67/04* (2013.01); *H04L 67/08* (2013.01); *H04L 67/1091* (2013.01); *H04L 67/1093* (2013.01); *H04L 67/1095* (2013.01); *H04L 67/34* (2013.01)

(58) Field of Classification Search
CPC ... H04L 67/125; H04L 67/28; H04L 67/2823; H04L 67/08; H04L 41/0846; H04L 41/0813; H04L 12/2807; H04L 41/0803; H04L 67/1095; H04L 67/1091; H04L 67/1093; H04L 67/04; H04L 67/34
See application file for complete search history.

(56) References Cited

U.S. PATENT DOCUMENTS

| | | | |
|---|---|---|---|
| 4,451,849 A | 5/1984 | Fuhrer | |
| 4,589,022 A | 5/1986 | Prince et al. | |
| 4,908,523 A | 3/1990 | Snowden et al. | |
| 4,928,307 A | 5/1990 | Lynn | |
| 4,951,171 A | 8/1990 | Tran et al. | |
| 5,164,831 A | 11/1992 | Kuchta | |
| 5,185,906 A | 2/1993 | Brooks | |
| 5,293,494 A | 3/1994 | Saito et al. | |
| 5,379,057 A | 1/1995 | Clough | |
| 5,406,305 A | 4/1995 | Shimomura et al. | |
| 5,559,945 A | 9/1996 | Beaudet et al. | |
| 5,566,337 A | 10/1996 | Szymanski et al. | |
| 5,583,993 A | 12/1996 | Foster et al. | |
| 5,608,698 A | 3/1997 | Yamanoi et al. | |
| 5,616,876 A | 4/1997 | Cluts | |
| 5,617,386 A | 4/1997 | Choi | |
| 5,670,985 A | 9/1997 | Cappels, Sr. et al. | |
| 5,675,362 A | 10/1997 | Clough | |
| 5,684,513 A | 11/1997 | Decker | |
| 5,710,922 A | 1/1998 | Alley et al. | |
| 5,712,949 A | 1/1998 | Kato et al. | |
| 5,717,422 A | 2/1998 | Fergason | |
| 5,721,949 A | 2/1998 | Smith et al. | |
| 5,726,672 A | 3/1998 | Hernandez et al. | |
| 5,739,451 A | 4/1998 | Winksy et al. | |
| 5,740,143 A | 4/1998 | Suetomi | |
| 5,760,588 A | 6/1998 | Bailey | |
| 5,778,374 A | 7/1998 | Dang et al. | |
| 5,803,786 A | 9/1998 | McCormick | |
| 5,808,662 A | 9/1998 | Kinney | |
| 5,815,225 A | 9/1998 | Nelson | |
| 5,822,288 A | 10/1998 | Shinada | |
| 5,835,721 A | 11/1998 | Donahue et al. | |
| 5,835,732 A | 11/1998 | Kikinis et al. | |
| 5,838,969 A | 11/1998 | Jacklin et al. | |
| 5,864,868 A | 1/1999 | Contois | |
| 5,867,163 A | 2/1999 | Kurtenbach | |
| 5,870,710 A | 2/1999 | Ozawa et al. | |
| 5,918,303 A | 6/1999 | Yamaura et al. | |
| 5,920,728 A | 7/1999 | Hallowell et al. | |
| 5,923,757 A | 7/1999 | Hocker et al. | |
| 5,952,992 A | 9/1999 | Helms | |
| 5,995,681 A | 11/1999 | Lee | |
| 6,006,274 A | 12/1999 | Hawkins et al. | |
| 6,009,237 A | 12/1999 | Hirabayashi et al. | |
| 6,011,585 A | 1/2000 | Anderson | |
| 6,018,705 A | 1/2000 | Gaudet et al. | |
| 6,041,023 A | 3/2000 | Lakhansingh | |
| 6,052,654 A | 4/2000 | Gaudet et al. | |
| 6,108,426 A | 8/2000 | Stortz | |
| 6,122,340 A | 9/2000 | Darley et al. | |
| 6,145,115 A * | 11/2000 | Nishimura | G05B 19/045 716/117 |
| 6,158,019 A | 12/2000 | Squibb | |
| 6,161,944 A | 12/2000 | Leman | |
| 6,172,948 B1 | 1/2001 | Keller et al. | |
| 6,173,172 B1 * | 1/2001 | Masuda | H04M 15/00 455/410 |
| 6,179,432 B1 | 1/2001 | Zhang et al. | |
| 6,185,163 B1 | 2/2001 | Bickford et al. | |
| 6,191,939 B1 | 2/2001 | Burnett | |
| 6,208,044 B1 | 3/2001 | Viswanadham et al. | |
| 6,216,131 B1 | 4/2001 | Liu et al. | |
| 6,217,183 B1 | 4/2001 | Shipman | |
| 6,248,946 B1 | 6/2001 | Dwek | |
| 6,278,447 B1 | 8/2001 | Anderson | |
| 6,295,541 B1 | 9/2001 | Bodnar et al. | |
| 6,297,795 B1 | 10/2001 | Kato et al. | |
| 6,298,314 B1 | 10/2001 | Blackadar et al. | |
| 6,332,175 B1 | 12/2001 | Birrell et al. | |
| 6,336,365 B1 | 1/2002 | Blackadar et al. | |
| 6,336,727 B1 | 1/2002 | Kim | |
| 6,341,316 B1 | 1/2002 | Kloba et al. | |
| 6,357,147 B1 | 3/2002 | Darley et al. | |
| 6,377,530 B1 | 4/2002 | Burrows | |
| 6,452,610 B1 | 9/2002 | Reinhardt et al. | |
| 6,467,924 B2 | 10/2002 | Shipman | |
| 6,493,652 B1 | 12/2002 | Ohlenbusch et al. | |
| 6,536,139 B2 | 3/2003 | Darley et al. | |
| 6,549,497 B2 | 4/2003 | Miyamoto et al. | |
| 6,549,970 B2 * | 4/2003 | Arai | G09G 1/167 345/99 |
| 6,560,903 B1 | 5/2003 | Darley | |
| 6,587,403 B1 | 7/2003 | Keller et al. | |
| 6,587,404 B1 | 7/2003 | Keller et al. | |
| 6,605,038 B1 | 8/2003 | Teller et al. | |
| 6,606,281 B2 | 8/2003 | Cowgill et al. | |
| 6,611,201 B1 | 8/2003 | Bishop et al. | |
| 6,611,607 B1 | 8/2003 | Davis et al. | |
| 6,611,789 B1 | 8/2003 | Darley | |
| 6,617,963 B1 | 9/2003 | Watters et al. | |
| 6,621,768 B1 | 9/2003 | Keller et al. | |
| 6,623,427 B2 | 9/2003 | Mandigo | |
| 6,631,101 B1 | 10/2003 | Chan et al. | |
| 6,670,536 B2 | 12/2003 | Godin et al. | |
| 6,693,612 B1 | 2/2004 | Matsumoto et al. | |
| 6,731,312 B2 | 5/2004 | Robbin | |
| 6,760,536 B1 | 7/2004 | Amir | |
| 6,762,741 B2 | 7/2004 | Weindorf | |
| 6,781,611 B1 | 8/2004 | Richard | |
| 6,794,566 B2 | 9/2004 | Pachet | |
| 6,799,226 B1 | 9/2004 | Robbin et al. | |
| 6,801,964 B1 | 10/2004 | Mandavi | |
| 6,832,373 B2 | 12/2004 | O'Neill | |
| 6,844,511 B1 | 1/2005 | Hsu et al. | |
| 6,870,529 B1 | 3/2005 | Davis | |
| 6,871,063 B1 | 3/2005 | Schiffer | |
| 6,876,947 B1 | 4/2005 | Darley et al. | |
| 6,882,955 B1 | 4/2005 | Ohlenbusch et al. | |
| 6,886,749 B2 | 5/2005 | Chiba et al. | |
| 6,898,550 B1 | 5/2005 | Blackadar et al. | |
| 6,911,971 B2 | 6/2005 | Suzuki et al. | |
| 6,918,677 B2 | 7/2005 | Shipman | |
| 6,930,709 B1 | 8/2005 | Creamer | |
| 6,931,377 B1 | 8/2005 | Seya | |
| 6,934,812 B1 | 8/2005 | Robbin et al. | |
| 6,950,087 B2 | 9/2005 | Knox et al. | |
| 7,006,881 B1 | 2/2006 | Hoffberg | |
| 7,010,365 B2 | 3/2006 | Maymudes et al. | |
| 7,028,096 B1 | 4/2006 | Lee | |
| 7,046,230 B2 | 5/2006 | Zadesky | |
| 7,062,225 B2 | 6/2006 | White | |
| 7,076,561 B1 | 7/2006 | Rosenberg et al. | |
| 7,084,856 B2 | 8/2006 | Huppi | |
| 7,084,921 B1 | 8/2006 | Ogawa | |
| 7,092,946 B2 | 8/2006 | Bodnar | |

(56) References Cited

U.S. PATENT DOCUMENTS

| | | | |
|---|---|---|---|
| 7,124,125 B2 | 10/2006 | Cook et al. | |
| 7,130,616 B2 * | 10/2006 | Janik | H04L 67/2823 |
| | | | 348/460 |
| 7,131,059 B2 | 10/2006 | Obrador | |
| 7,143,241 B2 | 11/2006 | Hull | |
| 7,146,437 B2 | 12/2006 | Robbin et al. | |
| 7,149,755 B2 | 12/2006 | Obrador | |
| 7,149,813 B2 | 12/2006 | Flanagin | |
| 7,162,543 B2 | 1/2007 | Fischer | |
| 7,166,791 B2 | 1/2007 | Robbin | |
| 7,171,331 B2 | 1/2007 | Vock et al. | |
| 7,191,244 B2 | 3/2007 | Jennings et al. | |
| 7,213,228 B2 | 5/2007 | Putterman et al. | |
| 7,234,026 B2 | 6/2007 | Robbin et al. | |
| 7,277,928 B2 | 10/2007 | Lennon | |
| 7,281,034 B1 | 10/2007 | Eyal | |
| 7,301,857 B2 | 11/2007 | Shah et al. | |
| 7,356,679 B1 | 4/2008 | Le et al. | |
| 7,366,659 B2 | 4/2008 | Etter | |
| 7,426,532 B2 | 9/2008 | Bell | |
| 7,433,546 B2 | 10/2008 | Marriott | |
| 7,487,226 B2 | 2/2009 | Blair | |
| 7,508,535 B2 | 3/2009 | Hart et al. | |
| 7,536,565 B2 * | 5/2009 | Girish et al. | 713/300 |
| 7,565,036 B2 | 7/2009 | Marriott | |
| 7,593,782 B2 | 9/2009 | Jobs et al. | 700/94 |
| 7,616,097 B1 * | 11/2009 | Whang | G09G 3/3406 |
| | | | 340/321 |
| 7,627,808 B2 | 12/2009 | Blank et al. | 709/208 |
| 7,673,083 B2 | 3/2010 | Laefer et al. | |
| 7,716,373 B2 | 5/2010 | Hamanaka | |
| 7,729,791 B2 * | 6/2010 | Boettcher | 700/94 |
| 7,735,012 B2 | 6/2010 | Naik et al. | |
| 7,812,066 B2 | 10/2010 | Takenaka | |
| 7,827,259 B2 | 11/2010 | Heller et al. | |
| 7,930,369 B2 | 4/2011 | Marriott et al. | 709/220 |
| 8,078,685 B2 | 12/2011 | Marriott et al. | 709/220 |
| 8,443,288 B2 * | 5/2013 | Mercs | H04L 67/28 |
| | | | 715/733 |
| 8,522,296 B2 * | 8/2013 | Kim et al. | 725/110 |
| 10,148,495 B1 * | 12/2018 | Oczkowski | H04L 41/0806 |
| 2001/0013983 A1 | 8/2001 | Izawa et al. | |
| 2001/0029178 A1 | 10/2001 | Criss et al. | |
| 2001/0037367 A1 | 11/2001 | Iyer et al. | |
| 2001/0041021 A1 | 11/2001 | Boyle et al. | |
| 2001/0042107 A1 | 11/2001 | Palm | |
| 2002/0002413 A1 | 1/2002 | Tokue | |
| 2002/0013784 A1 | 1/2002 | Swanson | |
| 2002/0028683 A1 | 3/2002 | Banatre et al. | |
| 2002/0045961 A1 | 4/2002 | Gibbs et al. | |
| 2002/0046296 A1 | 4/2002 | Kloba | |
| 2002/0046315 A1 | 4/2002 | Miller et al. | |
| 2002/0055934 A1 | 5/2002 | Lipscomb et al. | |
| 2002/0059440 A1 | 5/2002 | Hudson et al. | |
| 2002/0059499 A1 | 5/2002 | Hudson | |
| 2002/0090912 A1 | 7/2002 | Cannon et al. | |
| 2002/0116082 A1 | 8/2002 | Gudorf | |
| 2002/0116517 A1 | 8/2002 | Hudson et al. | |
| 2002/0122031 A1 | 9/2002 | Maglio et al. | |
| 2002/0123359 A1 | 9/2002 | Wei et al. | |
| 2002/0152045 A1 | 10/2002 | Dowling et al. | |
| 2002/0154146 A1 | 10/2002 | Rodriquez | |
| 2002/0156833 A1 | 10/2002 | Maurya et al. | |
| 2002/0161865 A1 | 10/2002 | Nguyen | |
| 2002/0173273 A1 | 11/2002 | Spurgat et al. | |
| 2002/0189426 A1 | 12/2002 | Hirade et al. | |
| 2002/0189429 A1 | 12/2002 | Qian et al. | |
| 2002/0199043 A1 | 12/2002 | Yin | |
| 2003/0002688 A1 | 1/2003 | Kanevsky et al. | |
| 2003/0007001 A1 | 1/2003 | Zimmerman | |
| 2003/0014767 A1 | 1/2003 | Stumphauzer et al. | |
| 2003/0018799 A1 | 1/2003 | Eyal | |
| 2003/0037254 A1 | 2/2003 | Fischer et al. | |
| 2003/0043191 A1 | 3/2003 | Tinsley | |
| 2003/0046434 A1 | 3/2003 | Flanagin et al. | |
| 2003/0050092 A1 | 3/2003 | Yun | |
| 2003/0074457 A1 | 4/2003 | Kluth | |
| 2003/0076301 A1 | 4/2003 | Tsuk et al. | |
| 2003/0076306 A1 | 4/2003 | Zadesky | |
| 2003/0079038 A1 | 4/2003 | Robbin et al. | |
| 2003/0095096 A1 | 5/2003 | Robbin et al. | |
| 2003/0097379 A1 | 5/2003 | Ireton | |
| 2003/0104835 A1 | 6/2003 | Douhet | |
| 2003/0110297 A1 | 6/2003 | Tabatabai | |
| 2003/0127307 A1 | 7/2003 | Liu et al. | |
| 2003/0128192 A1 | 7/2003 | van Os | |
| 2003/0131002 A1 | 7/2003 | Gennetten | |
| 2003/0133694 A1 | 7/2003 | Yeo | |
| 2003/0153213 A1 | 8/2003 | Siddiqui et al. | |
| 2003/0156503 A1 | 8/2003 | Schilling, Jr. et al. | |
| 2003/0167318 A1 | 9/2003 | Robbin et al. | |
| 2003/0176935 A1 | 9/2003 | Lian et al. | |
| 2003/0182100 A1 | 9/2003 | Plastina et al. | |
| 2003/0221541 A1 | 12/2003 | Platt | |
| 2003/0229490 A1 | 12/2003 | Etter | |
| 2003/0236695 A1 | 12/2003 | Litwin, Jr. | |
| 2004/0001395 A1 | 1/2004 | Keller et al. | |
| 2004/0001396 A1 | 1/2004 | Keller et al. | |
| 2004/0012556 A1 | 1/2004 | Yong et al. | |
| 2004/0015193 A1 | 1/2004 | Arai | |
| 2004/0055446 A1 | 3/2004 | Robbin et al. | |
| 2004/0056619 A1 * | 3/2004 | Jonsson | H02P 1/26 |
| | | | 318/440 |
| 2004/0057348 A1 | 3/2004 | Shteyn et al. | |
| 2004/0066363 A1 | 4/2004 | Yamano et al. | |
| 2004/0069122 A1 | 4/2004 | Wilson | |
| 2004/0076086 A1 | 4/2004 | Keller | |
| 2004/0086120 A1 | 5/2004 | Akins et al. | 380/240 |
| 2004/0094018 A1 | 5/2004 | Ueshima et al. | |
| 2004/0100492 A1 * | 5/2004 | Mercs | H04L 67/125 |
| | | | 715/744 |
| 2004/0103411 A1 | 5/2004 | Thayer et al. | |
| 2004/0125522 A1 | 7/2004 | Chiu et al. | |
| 2004/0139233 A1 | 7/2004 | Kellerman | |
| 2004/0165302 A1 | 8/2004 | Lu | |
| 2004/0177063 A1 | 9/2004 | Weber et al. | |
| 2004/0187157 A1 | 9/2004 | Chong | |
| 2004/0198436 A1 | 10/2004 | Alden | |
| 2004/0203387 A1 * | 10/2004 | Grannan | H04L 12/282 |
| | | | 455/41.2 |
| 2004/0210628 A1 | 10/2004 | Inkinen et al. | |
| 2004/0216108 A1 | 10/2004 | Robbin | |
| 2004/0221044 A1 | 11/2004 | Rosenbloom | |
| 2004/0224638 A1 | 11/2004 | Fadell et al. | |
| 2004/0242224 A1 | 12/2004 | Janik et al. | |
| 2004/0246275 A1 | 12/2004 | Yoshihara et al. | |
| 2004/0252119 A1 | 12/2004 | Hunleth | |
| 2004/0252604 A1 | 12/2004 | Johnson et al. | |
| 2004/0255135 A1 | 12/2004 | Kitaya et al. | |
| 2004/0260782 A1 | 12/2004 | Affleck | |
| 2004/0267825 A1 | 12/2004 | Novak et al. | |
| 2005/0015254 A1 | 1/2005 | Beaman | |
| 2005/0038875 A1 * | 2/2005 | Park | H04L 12/2803 |
| | | | 709/219 |
| 2005/0045373 A1 | 3/2005 | Born et al. | |
| 2005/0053365 A1 | 3/2005 | Adams et al. | |
| 2005/0060240 A1 | 3/2005 | Popofsky | |
| 2005/0060542 A1 | 3/2005 | Risan et al. | |
| 2005/0086320 A1 | 4/2005 | Blair | |
| 2005/0102377 A1 | 5/2005 | King et al. | |
| 2005/0108754 A1 | 5/2005 | Carhart et al. | |
| 2005/0111820 A1 | 5/2005 | Matsumi et al. | |
| 2005/0122315 A1 | 6/2005 | Chalk et al. | |
| 2005/0123886 A1 | 6/2005 | Hua et al. | |
| 2005/0146534 A1 | 7/2005 | Fong et al. | |
| 2005/0149204 A1 | 7/2005 | Manchester | |
| 2005/0149213 A1 | 7/2005 | Guzak et al. | 700/94 |
| 2005/0152294 A1 | 7/2005 | Yu et al. | |
| 2005/0156047 A1 | 7/2005 | Chiba et al. | |
| 2005/0159964 A1 | 7/2005 | Sonnenrein et al. | |
| 2005/0160270 A1 | 7/2005 | Goldberg et al. | |
| 2005/0166153 A1 | 7/2005 | Eytchison et al. | |
| 2005/0201572 A1 * | 9/2005 | Lindahl | H03G 5/165 |
| | | | 381/103 |

(56) References Cited

U.S. PATENT DOCUMENTS

| | | |
|---|---|---|
| 2005/0210101 A1* | 9/2005 | Janik .............. G06F 17/30044 709/203 |
| 2005/0216855 A1 | 9/2005 | Kopra et al. |
| 2005/0218303 A1 | 10/2005 | Poplin |
| 2005/0234983 A1 | 10/2005 | Plastina et al. |
| 2005/0235048 A1 | 10/2005 | Costa-Requena |
| 2005/0239397 A1* | 10/2005 | Kreifeldt .............. H04L 67/125 455/3.01 |
| 2005/0245839 A1 | 11/2005 | Stivoric et al. |
| 2005/0246324 A1 | 11/2005 | Paalasmaa et al. |
| 2005/0248555 A1 | 11/2005 | Feng et al. |
| 2005/0257169 A1 | 11/2005 | Tu |
| 2005/0259064 A1 | 11/2005 | Sugino et al. |
| 2005/0259524 A1 | 11/2005 | Yeh |
| 2005/0259758 A1 | 11/2005 | Razzell |
| 2005/0270276 A1 | 12/2005 | Sugimoto et al. |
| 2006/0013414 A1 | 1/2006 | Shih |
| 2006/0025068 A1 | 2/2006 | Regan et al. |
| 2006/0026424 A1 | 2/2006 | Eto |
| 2006/0061563 A1 | 3/2006 | Fleck |
| 2006/0065709 A1 | 3/2006 | Yamashita et al. |
| 2006/0067295 A1* | 3/2006 | Lehotsky .............. H04W 28/18 370/351 |
| 2006/0068760 A1 | 3/2006 | Hameed et al. |
| 2006/0071899 A1 | 4/2006 | Chang et al. |
| 2006/0085653 A1 | 4/2006 | Bollinger |
| 2006/0088205 A1 | 4/2006 | Choi |
| 2006/0088228 A1 | 4/2006 | Marriott et al. |
| 2006/0090122 A1 | 4/2006 | Pyhalammi |
| 2006/0092122 A1 | 5/2006 | Yoshihara et al. |
| 2006/0094409 A1 | 5/2006 | Inselberg |
| 2006/0095502 A1 | 5/2006 | Lewis et al. |
| 2006/0098320 A1 | 5/2006 | Koga et al. |
| 2006/0135883 A1 | 6/2006 | Jonsson et al. |
| 2006/0145053 A1 | 7/2006 | Stevenson et al. |
| 2006/0152382 A1 | 7/2006 | Hiltunen |
| 2006/0155914 A1 | 7/2006 | Jobs et al. |
| 2006/0156239 A1* | 7/2006 | Jobs .................. G06F 17/30053 715/727 |
| 2006/0168340 A1* | 7/2006 | Heller .................. G11B 27/002 709/242 |
| 2006/0170535 A1 | 8/2006 | Watters et al. |
| 2006/0173974 A1 | 8/2006 | Tang |
| 2006/0190577 A1 | 8/2006 | Yamada |
| 2006/0190980 A1 | 8/2006 | Kikkoji et al. |
| 2006/0221057 A1 | 10/2006 | Fux et al. |
| 2006/0221788 A1* | 10/2006 | Lindahl .................. G10L 21/04 369/47.15 |
| 2006/0232449 A1 | 10/2006 | Jain et al. |
| 2006/0265503 A1 | 11/2006 | Jones et al. |
| 2006/0272483 A1 | 12/2006 | Honeywell |
| 2006/0277336 A1 | 12/2006 | Lu et al. |
| 2007/0014536 A1 | 1/2007 | Hellman |
| 2007/0028009 A1 | 2/2007 | Robbin et al. |
| 2007/0049197 A1 | 3/2007 | Klein et al. |
| 2007/0061759 A1 | 3/2007 | Klein, Jr. |
| 2007/0073727 A1 | 3/2007 | Klein et al. |
| 2007/0083467 A1* | 4/2007 | Lindahl ............ G11B 20/00086 705/50 |
| 2007/0088806 A1 | 4/2007 | Marriott et al. .............. 709/217 |
| 2007/0089057 A1 | 4/2007 | Kindig |
| 2007/0106660 A1 | 5/2007 | Stern et al. |
| 2007/0124679 A1 | 5/2007 | Jeong et al. |
| 2007/0129062 A1 | 6/2007 | Pantalone et al. |
| 2007/0135225 A1 | 6/2007 | Nieminen et al. |
| 2007/0248311 A1 | 10/2007 | Wice et al. |
| 2007/0255163 A1 | 11/2007 | Prineppi |
| 2008/0046948 A1 | 2/2008 | Verosub |
| 2008/0055228 A1 | 3/2008 | Glen |
| 2008/0134287 A1 | 6/2008 | Gudorf et al. |
| 2008/0268814 A1* | 10/2008 | Asakura .................. H04L 63/18 455/411 |
| 2009/0216814 A1 | 8/2009 | Marriott |
| 2010/0077338 A1 | 3/2010 | Matthews et al. |
| 2011/0167140 A1 | 7/2011 | Marriott et al. .............. 709/220 |
| 2012/0124157 A1 | 5/2012 | Marriott et al. .............. 709/208 |
| 2016/0099977 A1* | 4/2016 | Cheng .................. H04L 12/2807 709/204 |
| 2018/0023837 A1* | 1/2018 | Kraft .................. H04L 41/0846 700/276 |

FOREIGN PATENT DOCUMENTS

| | | |
|---|---|---|
| EP | 0 127 139 | 5/1984 |
| EP | 0578604 | 1/1994 |
| EP | 0 757 437 | 2/1997 |
| EP | 0 813 138 | 12/1997 |
| EP | 0 863 469 | 9/1998 |
| EP | 0 917 077 | 5/1999 |
| EP | 0 982 732 | 3/2000 |
| EP | 1 028 425 | 8/2000 |
| EP | 1028426 A2 | 8/2000 |
| EP | 1 076 302 | 2/2001 |
| EP | 1213643 | 6/2002 |
| EP | 1286536 A2 | 2/2003 |
| EP | 1 289 197 | 3/2003 |
| EP | 1372133 A1 | 12/2003 |
| EP | 1503363 | 2/2005 |
| EP | 1536612 | 6/2005 |
| EP | 1566743 | 8/2005 |
| EP | 1566948 | 8/2005 |
| EP | 372133 | 12/2005 |
| EP | 1686496 | 8/2006 |
| GB | 2 370 208 | 6/2002 |
| GB | 2384399 | 7/2003 |
| GB | 2399639 | 5/2005 |
| JP | 59-023610 | 2/1984 |
| JP | 03-228490 | 10/1991 |
| JP | 04-243386 | 8/1992 |
| JP | 6-96520 | 4/1994 |
| JP | 8-235774 | 9/1996 |
| JP | 9-50676 | 2/1997 |
| JP | 9-259532 | 10/1997 |
| JP | 2000-90651 | 3/2000 |
| JP | 2000134522 A | 5/2000 |
| JP | 2000-224099 | 8/2000 |
| JP | 2000-285643 | 10/2000 |
| JP | 2000-299834 | 10/2000 |
| JP | 2000-311352 | 11/2000 |
| JP | 2000-339864 | 12/2000 |
| JP | 2001-236286 | 8/2001 |
| JP | 2001-312338 | 11/2001 |
| JP | 2002-076977 | 3/2002 |
| JP | 2002-175467 | 6/2002 |
| JP | 2003099357 A | 4/2003 |
| JP | 2003-188792 | 7/2003 |
| JP | 2003-259333 | 9/2003 |
| JP | 2003-319365 | 11/2003 |
| JP | 2004-021720 | 1/2004 |
| JP | 2004-219731 | 8/2004 |
| JP | 2004-220420 | 8/2004 |
| JP | 2004247844 A | 9/2004 |
| KR | 20010076508 | 8/2001 |
| WO | WO 01/33569 | 6/1995 |
| WO | WO 95/16950 | 6/1995 |
| WO | 98/17032 | 4/1998 |
| WO | WO 99/28813 | 6/1999 |
| WO | WO 00/22820 | 4/2000 |
| WO | 0129702 A2 | 4/2001 |
| WO | WO 01/65413 | 9/2001 |
| WO | WO 01/67753 | 9/2001 |
| WO | 0186511 A2 | 11/2001 |
| WO | WO 02/25610 | 3/2002 |
| WO | WO 03/023786 | 3/2003 |
| WO | WO 03/036457 | 5/2003 |
| WO | WO 03/067202 | 8/2003 |
| WO | WO 2004/055637 | 7/2004 |
| WO | WO 2004/061850 | 7/2004 |
| WO | WO2004/084413 A2 | 9/2004 |
| WO | WO 2004/104815 | 12/2004 |
| WO | WO 2005/008505 | 1/2005 |
| WO | WO 2005/031737 | 4/2005 |
| WO | 05/048644 | 5/2005 |

(56) References Cited

FOREIGN PATENT DOCUMENTS

| WO | 2005/109781 | 11/2005 |
|---|---|---|
| WO | WO 2006/040737 | 4/2006 |
| WO | 2006/071364 | 6/2006 |

OTHER PUBLICATIONS

International Search Report dated Dec. 5, 2007 in Patent Application No. PCT/US2007/004810.
International Search Report dated Jan. 29, 2008 in Patent Application No. PCT/US2006/048738.
International Search Report dated Jan. 28, 2008 in Patent Application No. PCT/US2007/077020.
International Search Report dated Jan. 28, 2008 in Patent Application No. PCT/US2007/076889.
ITunes, Wikipedia: The Free Encyclopedia; downloaded on Oct. 5, 2006, pp. 1-6.
Nutzel et al., "Sharing Systems for Future HiFi Systems", The Computer Society, Jun. 2004.
Partial Search Report dated Sep. 6, 2007 in Patent Application No. PCT/US2007/004810.
Written Opinion dated Dec. 5, 2007 in Patent Application No. PCT/US2007/004810.
Written Opinion dated Jan. 29, 2008 in Patent Application No. PCT/US2006/048738.
Written Opinion dated Jan. 28, 2008 in Patent Application No. PCT/US2007/076889.
Written Opinion dated Jan. 28, 2008 in Patent Application No. PCT/US2007/077020.
Office Action dated Feb. 1, 2008 in U.S. Appl. No. 11/327,544.
Hart-Daves, Guy, "How to Do Everything With Your iPod and iPod Mini", 2004, McGraw-Hill Professional, p. 33.
Office Action dated Feb. 4, 2008 in U.S. Appl. No. 11/566,072.
"Apple Announces iTunes 2," Press Release, Apple Computer, Inc., Oct. 23, 2001.
"Apple Introduces iTunes—World's Best and Easiest to Use Jukebox Software," Macworld Expo, San Francisco, Jan. 9, 2001.
"Apple's iPod Available in Stores Tomorrow," Press Release, Apple Computer, Inc., Nov. 9, 2001.
"Combination Belt Clip Leaf Spring and Housing Latch", Wandt et al.; Motorola Technical Developments, Motorla Inc. Schaumburg, IL. vol. 18, Mar. 1, 1993.
"Creative Zen Vision: M 30GB", Dec. 21, 2005; downloaded on Jan. 11, 2008 from http://web.archive.org/web/20051221050140/http://www.everthingusb.com/creative_zen_vision:m_30gb.html>.
"Nomad Jukebox," User Guide, Creative Technology Ltd., Version 1, Aug. 2000.
"SoundJam Plus Manual, version 2.0"—MP3 Player and Encoder for Macintosh by Jeffrey Robbin, Bill Kincaid and Dave Heller, manual by Tom Negrino, published by Casady & Greene, Inc., 2000.
"12.1" 925 Candela Mobile PC, downloaded from LCDHardware.com on Dec. 19, 2002, http://www.lcdharware.com/panel/12_1_panel/default.asp.
"BL82 Series Backlit Keyboards", www.tg3electronics.com/products/backlit/backlit.htm, downloaded Dec. 19, 2002.
"Bluetooth PC Headsets—Enjoy Wireless VoIP Conversations: 'Connecting' Your Bluetooth Headset With Your Computer", Bluetooth PC Headsets; downloaded on Apr. 29, 2006 from http://www.bluetoothpcheadsets.com/connect.htm.
"Creative liefert erstes Portable Media Center aus" [Online] Sep. 2, 2004, Retrieved from the internet on Sep. 20, 2007 from http://www.golem.de/0409/33347.html>.
"Creative MuVo TX 256 MB," T3 Magazine, Aug. 17, 2004, http://www.t3.co.uk/reviews/entertainment/mp3_player/creative_muvo_tx_256mb [downloaded Jun. 6, 2006].
"Digital Still Cameras—Downloading Images to a Computer," Mimi Chakarova et al., Multi-Media Reporting and Convergence, 2 pgs.

"Eluminx Illuminated Keyboard", downloaded Dec. 19, 2002, http://www.elumix.com/.
"How to Pair a Bluetooth Headset & Cell Phone", About.com; downloaded on Apr. 29, 2006 from http://mobileoffice.about.com/od/usingyourphone/ht/blueheadset_p.htm.
"Peripherals for Industrial Keyboards & Pointing Devices", Stealth Computer Corporation, downloaded on Dec. 19, 2002, http://www.stealthcomputer.com/peropherals_oem.htm.
"Poly-Optical Fiber Optic Membrane Switch Backlighting", downloaded Dec. 19, 2002, http://www.poly-optical.com/membrane_switches.html.
"Public Safety Technologies Tracer 2000 Computer", downloaded Dec. 19, 2002, http://www.pst911.com/traver.html.
"QuickTime Movie Playback Programming Guide", Apple Computer, Inc., Aug. 11, 2005.
"QuickTime Overview", Apple Computer, Inc., Aug. 11, 2005.
"Rocky Matrix Backlit Keyboard", downloaded Dec. 19, 2002, http://www.amrel.com/asi_matrixkeyboard.html.
"Sony Ericsson to introduce Auto pairing to improve Bluetooth connectivity between headsets and phones", Sep. 28, 2005 Press Release, Sony Ericsson Corporate; downloaded on Apr. 29, 2006 from http://www.sonyericsson.com/spg.jsp?cc=global&lc=en&ver=4001&template=pc3_1_1&z . . . .
"TAOS, Inc., Announces Industry's First Ambient Light Sensor to Convert Light Intensity to Digital Signals", www.taosinc.com/pressrelease_090902.htm, downloaded Jan. 23, 2003.
"Toughbook 28: Powerful, Rugged and Wireless", Panasonic: Toughbook Models, downloaded Dec. 19, 2002, http:www.panasonic.com/computer/notebook/html/01a_s8.htm.
"When it Comes to Selecting a Projection TV, Toshiba Makes Everything Perfectly Clear, Previews of New Releases", www.bestbuy.com/HomeAudioVideo/Specials/ToshibaTVFeatures.asp, downloaded Jan. 23, 2003.
"WhyBuy: Think Pad", IBM ThinkPad Web Page Ease of Use, downloaded on Dec. 19, 2002, http://www.pc.ibm.com/us/thinkpad/easeofuse.html.
512MB Waterproof MP3 Player with FM Radio & Built-in Pedometer, Oregon Scientific, downloaded on Jul. 31, 2006 from http://www2.oregonscientific.com/shop/product.asp?cid=4&scid=11&pid=581.
Adam C. Engst, "SoundJam Keeps on Jammin'," Jun. 19, 2000, http://db.tidbits.com/getbits.acgi?tbart=05988.
Alex Veiga, "AT&T Wireless Launching Music Service," Yahoo! Finance, Oct. 5, 2004, pp. 1-2.
Andrew Birrell, "Personal Jukebox (PJB)," Oct. 13, 2000, http://birrell.org/andrew/talks/pjb-overview.ppt.
Apple iPod Technical Specifications, iPod 20GB and 60GB Mac + PC, downloaded from http://www.apple.com/ipod/color/specs.html on Aug. 8, 2005.
Bociurkiw, Michael, "Product Guide: Vanessa Matz,", www.forbes.com/asap/2000/1127/vmartz_print.html, Nov. 27, 2000.
Compaq, "Personal Jukebox," Jan. 24, 2001, http://research.compaq.com/SRC/pjb/.
Creative: "Creative NOMAD MuVo TX," www.creative.com, Nov. 1, 2004, http://web.archive.org/web/20041024175952/www.creative.com/products/pfriendly.asp?product=9672 [downloaded Jun. 6, 2006].
Creative: "Creative NOMAD MuVo," www.creative.com, Nov. 1, 2004, http://web.archive.org/web/20041024075901/www.creative.com/products/product.asp?category=213&subcategory=215&product=110 [downloaded Jun. 7, 2006].
Creative: "MP3 Player," www.creative.com, Nov. 1, 2004, http://web.archive.org/web/20041024074823/www.creative.com/products/product.asp?category=213&subcategory=216&product=4983 [downloaded Jun. 7, 2006].
De Herrera, Chris, "Microsoft ActiveSync 3.1," Version 1.02, Oct. 13, 2000.
Examination Report dated Sep. 1, 2009 in Singapore Application No. 200701865-8.
IAP Sports Lingo 0x09 Protocol V1.00, May 1, 2006.
IEEE 1394—Wikipedia, 1995, http://www.wikipedia.org/wiki/Firewire.
International Search Report dated Feb. 4, 2003 in corresponding application No. PCT/US2002/033330.

(56) References Cited

OTHER PUBLICATIONS

International Search Report dated Jul. 10, 2007 in corresponding application No. PCT/US2006/048738.
International Search Report dated Apr. 5, 2006 from corresponding International Application No. PCT/US2005/038819.
International Search Report dated Feb. 18, 2008 in Patent Application No. PCT/US2007/079766.
International Search Report dated Jul. 2, 2007 in related case PCT/US2006/048669.
International Search Report dated Jul. 7, 2008 in PCT Application No. PCT/US2007/076793.
International Search Report dated Jun. 10, 2008 in PCT Application No. PCT/US2007/010630.
International Search Report dated Jun. 19, 2007 in related Application PCT/US2006/048753.
International Search Report dated May 21, 2007 from corresponding PCT Application No. PCT/US2006/048670.
International Search Report dated Nov. 24, 2006 in PCT Application No. PCT/US2005/046797.
International Search Report dated Oct. 10, 2008 in PCT Application No. PCT/US2007/077160.
International Search Report Dated Sep. 27, 2007 in Application No. 05824296.7.
International Search Report in corresponding European Application No. 06256215.2 dated Feb. 20, 2007.
International Search Report in Patent Application No. PCT/US2007/076889 dated Jan. 28, 2008.
Invitation to Pay Additional Fees and Partial Search Report for corresponding PCT Application No. PCT/US2005/046797 dated Jul. 3, 2006.
Invitation to Pay Additional Fees and Partial Search Report for PCT Application No. PCT/US2007/077160 dated Apr. 1, 2008.
ITunes 2, Playlist Related Help Screens, iTunes v2.0, Apple Computer, Inc., Oct. 23, 2001.
ITunes, Playlist Related Help Screens, iTunes v1.0, Apple Computer, Inc., Jan. 2001.
Jabra Bluetooth Headset User Manual; GN Netcom A/s, 2005.
Jabra Bluetooth Introduction; GN Netcom A/S, Oct. 2004.
Jabra FreeSpeak BT200 User Manual; Jabra Corporation, 2002.
Peker et al., "Adaptive Fast Playback-Based Video Skimming Using a Compressed-Domain Visual Complexity Measure", 2004 IEEE International Conference on Multimedia and Expo, pp. 2055-2058.
Kennedy, "Digital Data Storage Using Video Disc," IBM Technical Disclosure Bulletin, vol. 24, No. 2, Jul. 1981.
Miniman, "Applian Software's Replay Radio and Player v1.02," Product review, pocketnow.com, http://www.pocketnow.com/reviews/replay/replay.htm, Jul. 31, 2001.
Musicmatch, "Musicmatch and Xing Technology Introduce Musicmatch Jukebox," May 18, 1998, http://www.musicmatch.com/info/company/press/releases/?year=1998&release=2.
Nonhoff-Arps, et al., "Straßenmusik Portable MP3-Spieler mit USB-Anschluss," CT Magazin Fuer Computer Technik, Verlag Henz Heise GMBH, Hannover DE, No. 25, Dec. 4, 2000.
Notice of Allowance dated Apr. 21, 2009 in U.S. Appl. No. 11/327,544.
Notice of Allowance dated Dec. 18, 2008 in U.S. Appl. No. 11/212,555.
Notice of Allowance dated Feb. 4, 2010 in U.S. Appl. No. 11/535,646.
Notice of Allowance dated Jun. 15, 2009 in U.S. Appl. No. 11/212,313.
Notification of Reason for Rejection from PCT Application No. 2003-539048 dated Nov. 27, 2007.
Office Action dated Apr. 12, 2010 in U.S. Appl. No. 12/397,051.
Office Action dated Apr. 13, 2010 in U.S. Appl. No. 12/406,793.
Office Action dated Apr. 15, 2010 in U.S. Appl. No. 11/373,468.
Office Action dated Apr. 4, 2008 in U.S. Appl. No. 11/212,555.
Office Action dated Apr. 9, 2009 in U.S. Appl. No. 11/583,199.
Office Action dated Dec. 11, 2009 in U.S. Appl. No. 11/519,352.
Office Action dated Dec. 14, 2009 in U.S. Appl. No. 11/535,646.
Office Action dated Dec. 15, 2008 in U.S. Appl. No. 11/212,313.
Office Action dated Dec. 16, 2009 in U.S. Appl. No. 11/746,548.
Office Action dated Feb. 20, 2008 in Japanese Application No. 2007-538196.
Office Action dated Feb. 25, 2008 in U.S. Appl. No. 11/749,599.
Office Action dated Feb. 3, 2010 in U.S. Appl. No. 11/439,613.
Office Action dated Jan. 26, 2009 in U.S. Appl. No. 11/373,468.
Office Action dated Jun. 17, 2008 in U.S. Appl. No. 11/212,313.
Office Action dated Jun. 2, 2009 in U.S. Appl. No. 11/530,773.
Office Action dated Jun. 22, 2009 in U.S. Appl. No. 11/515,270.
Office Action dated Jun. 24, 2009 in U.S. Appl. No. 11/373,468.
Office Action dated Jun. 24, 2009 in U.S. Appl. No. 11/519,352.
Office Action dated Mar. 11, 2010 in U.S. Appl. No. 11/830,746.
Office Action dated Mar. 24, 2010 in U.S. Appl. No. 11/583,199.
Office Action dated Mar. 25, 2010 in U.S. Appl. No. 11/297,032.
Office Action dated Mar. 30, 2009 in U.S. Appl. No. 11/515,270.
Office Action dated Mar. 4, 2008 from U.S. Appl. No. 10/973,657.
Office Action dated Mar. 4, 2010 in U.S. Appl. No. 11/324,863.
Office Action dated Mar. 9, 2010 in U.S. Appl. No. 11/519,352.
Office Action dated May 10, 2010 in EP Application No. 06 847 856.9.
Office Action dated May 11, 2009 in U.S. Appl. No. 11/680,580.
Office Action dated May 27, 2009 in U.S. Appl. No. 11/439,613.
Office Action dated May 29, 2009 in EP Application No. 06 847 856.9.
Office Action dated May 30, 2008 in Chinese Patent Application No. 02825938.6.
Office Action dated Nov. 16, 2009 in U.S. Appl. No. 11/144,541.
Office Action dated Nov. 16, 2009 in U.S. Appl. No. 11/439,613.
Office Action dated Oct. 16, 2008 in U.S. Appl. No. 11/327,544.
Office Action dated Oct. 16, 2009 in U.S. Appl. No. 11/583,199.
Office Action dated Oct. 23, 2009 in Chinese Application No. 200580048143.9.
Office Action dated Sep. 1, 2008 in EP Application No. 06 256 215.2.
Office Action dated Sep. 10, 2009 in U.S. Appl. No. 11/746,548.
Office Action dated Sep. 2, 2009 in U.S. Appl. No. 11/515,270.
Office Action dated Sep. 25, 2009 in Chinese Application No. 200610130904.1.
Office Action dated Sep. 3, 2009 in U.S. Appl. No. 11/324,863.
Office Action in European Patent Application No. 05 855 368.6 dated Nov. 20, 2008.
Office Action in Japanese Patent Application No. 2008-045351 dated Aug. 5, 2008.
Office Action in U.S. Appl. No. 11/212,555 dated Aug. 14, 2008.
Partial International Search Report dated Feb. 1, 2008 in Patent Application No. PCT/US2007/010630.
Personal Jukebox (PJB), "Systems Research Center and PAAD," Compaq Computer Corp., Oct. 13, 2000, http://research.compaq.com/SRC/pjb/.
Peter Lewis, "Two New Ways to Buy Your Bits," CNN Money, Dec. 31, 2003, pp. 1-4.
Sastry, Ravindra Wadali. "A Need for Speed: A New Speedometer for Runners", submitted to the Department of Electrical Engineering and Computer Science at the Massachusetts Institute of Technology, May 28, 1999.
Search Report dated May 15, 2008 in PCT Application No. PCT/US2007/019578.
Sinitsyn, Alexander. "A Synchronization Framework for Personal Mobile Servers," Pervasice Computing and Communications Workshops, 2004. Proceedings of the Second IEEE Annual Conference on, Piscataway, NJ, USA, IEEE, Mar. 14, 2004, pp. 208-212.
SoundJam MP Plus, Representative Screens, published by Casady & Greene, Inc., Salinas, CA, 2000.
Specification Sheet, iTunes 2, Apple Computer, Inc., Oct. 31, 2001.
Spiller, Karen. "Low-decibel earbuds keep noise at a reasonable level", The Telegraph Online, dated Aug. 13, 2006, http://www.nashu atelegraph.com/apps/pbcs.dll/article?Date=20060813&Cate . . . Downloaded Aug. 16, 2006.
Steinberg, "Sonicblue Rio Car," Product Review, Dec. 12, 2000, http://electronics.cnet.com/electronics/0-6342420-1304-4098389.html.
Travis Butler, "Archos Jukebox 6000 Challenges Nomad Jukebox," Aug. 13, 2001, http://db.tidbits.com/getbits.acgi?tbart=06521.

(56) References Cited

OTHER PUBLICATIONS

Travis Butler, "Portable MP3: The Nomad Jukebox," Jan. 8, 2001, http://db.tidbits.com/getbits.acgi?tbart=06261.
U.S. Appl. No. 11/621,541, "Personalized Podcasting Podmapping", filed Jan. 9, 2007.
Waterproof Music Player with FM Radio and Pedometer User Manual, Oregon Scientific, 2005.
Written Opinion dated Feb. 18, 2008 in Patent Application No. PCT/US2007/079766.
Written Opinion dated Jan. 6, 2009 in Singapore Application No. 200701865-8.
Written Opinion dated Jul. 7, 2008 in PCT Application No. PCT/US2007/076793.
Written Opinion dated Jun. 10, 2008 in PCT Application No. PCT/US2007/010630.
Written Opinion dated May 15, 2008 in PCT Application No. PCT/US2007/019578.
Written Opinion dated Oct. 10, 2008 in PCT Application No. PCT/US2007/077160.
Written Opinion of the International Searching Authority dated Nov. 24, 2006 in PCT Application No. PCT/US2005/046797.
Yee et al., "Faceted Metadata for Image Search and Browsing." Association for Computing Machinery, Conference Proceedings, Apr. 5, 2003.
Chinese Office Action dated Mar. 27, 2009 from Chinese Application No. 200580036581.3.
EP Application No. EP 05824296.7, Decision to Refuse a European Patent Application dated Oct. 26, 2011.
European Search Report dated Dec. 28, 2011 for EP Patent Application No. 10182668.3.
European Search Report dated Dec. 28, 2011 for EP Patent Application No. 10182794.7.
Fridrik Asmundsson & Herwig Lejsek—'The Application of the MEDRANK Algorithm to Content-Based Image Retrieval Using Local Descriptors' from RU.Is May 16, 2004 (pp. 1-12).
Japanese Final Office Action dated Apr. 3, 2009 from Japanese Application No. 2007-538196.
Summons to Attend Oral Proceedings dated Mar. 9, 2011 in EP Application No. 05824296.7.
Surendar Chandra & Ashish Gehani—'Transcoding Chracteristics of Web Images'—Department of Computer Science, Duke University, Durham, North Carolina CS-1999-17, Nov. 1999 (pp. 1-28).

\* cited by examiner

REMOTELY CONFIGURED MEDIA DEVICE

CROSS-REFERENCE TO RELATED APPLICATIONS

This application is a continuation of co-pending U.S. patent application Ser. No. 13/296,089, filed on Nov. 14, 2011, and entitled "REMOTELY CONFIGURED MEDIA DEVICE," which is a continuation of U.S. patent application Ser. No. 13/047,082, filed on Mar. 14, 2011, which issued on Mar. 14, 2011 as U.S. Pat. No. 8,078,685, and entitled "REMOTELY CONFIGURED MEDIA DEVICE," which is a continuation of U.S. patent application Ser. No. 11/583,327, filed on Oct. 18, 2006, which issued on Apr. 19, 2011 as U.S. Pat. No. 7,930,369, and entitled "REMOTELY CONFIGURED MEDIA DEVICE," which claims priority benefit of U.S. Provisional Application No. 60/728,671, filed Oct. 19, 2005, and entitled "REMOTELY CONFIGURED MEDIA DEVICE," all of which are hereby incorporated herein by reference in their entirety.

BACKGROUND OF THE INVENTION

Field of the Invention

The present invention relates to media devices and, more particularly, to configuration of media devices.

Description of the Related Art

Today, portable media devices, such as Personal Digital Assistants (PDAs) or hand-held media players, are battery powered and include various user interface components, such as displays and switches/buttons. Conventionally, portable media devices use buttons, dials or touchpads together with graphical user interfaces to control the devices, including setting of user preferences for use by the devices. These portable media devices continue to get smaller and more portable. At the same time, the functionality supported by portable media devices is increasing. Consequently, as portable media devices get smaller while supporting robust functionality, there are increasing difficulties in providing adequate user interfaces for the portable media devices.

Accordingly, there is a need for improved user interface capabilities for portable media players.

SUMMARY OF THE INVENTION

The invention relates to improved techniques for controlling operation of a portable electronic device. According to the invention, portable electronic devices which interact with a host electronic device can have their operational settings (e.g., configurations or preferences) remotely controlled. As a result, a host electronic device can offer a more sophisticated user interface and portable electronic devices need less local user interface features because these operational settings can be remotely controlled. The remotely-controlled (i.e., host controlled) operational settings are transferred to the portable electronic devices, whereby the portable electronic devices can thereafter operate in accordance with such settings.

The invention can be implemented in numerous ways, including as a method, system, device, apparatus, or computer readable medium. Several embodiments of the invention are discussed below.

As a method for remotely providing operational settings from a host electronic device to a client electronic device, the host electronic device having a display, one embodiment of the invention includes at least the acts of: presenting a user interface on the display of the host electronic device, the user interface permitting a user of the host electronic device to select operational settings for use with the client electronic device; receiving a user selection of at least one operational setting for the client electronic device, the user selection being from the user while interacting with the user interface on the host electronic device; and transferring the at least one operational setting from the host electronic device to the client electronic device, whereby the client electronic device stores the at least one operational setting and thereafter operates in accordance with the stored at least one operational setting.

As a method for operating a portable media player in accordance with operational settings, one embodiment of the invention includes at least the acts of: receiving operational settings data from a host computer over a data link between the portable media player and the host computer; storing the operational settings data at the portable media player; and operating a media management application on the portable media player in accordance with the stored operational settings data.

As a computer readable medium including at least computer program code for remotely providing operational settings from a host device to a client device, one embodiment of the invention includes at least: computer program code for presenting a user interface on a display of the host device, the user interface permitting a user of the host device to select operational settings for use with the client device; computer program code for receiving a user selection of at least one operational setting for the client device, the user selection being from the user while interacting with the user interface on the host device; and computer program code for transferring the at least one operational setting from the host device to the client device, whereby the client device stores the at least one operational setting and thereafter operates in accordance with the stored at least one operational setting.

As a computer readable medium including at least computer program code for operating a portable media player in accordance with operational settings, one embodiment of the invention includes at least: computer program code for receiving operational settings data from a host computer over a data link between the portable media player and the host computer; computer program code for storing the operational settings data at the portable media player; and computer program code for operating a media management application on the portable media player in accordance with the stored operational settings data.

As a portable media player for storing and presenting media assets, one embodiment of the invention includes at least: an input/output interface that provides a data connection with a remote computing device; at least one data storage device that stores the media assets and operational settings data, the media assets and the operational settings data being provided over the data connection from the remote computing device; and a media management application that presents one or more of the media assets in accordance with the operational settings data.

As a media system, one embodiment of the invention includes a host computer for storing and presenting host media assets, and a client media player for storing and presenting client media assets. The host computer includes at least: a host input/output interface that provides connection with the client media player; a host media management application that (i) enables a user of the host computer to set user preferences to be used on the client media player, and (ii) transfers one or more of the host media assets from the host computer to become the client media assets at the client media player; and at least one host data storage device that stores the host media assets and the user preferences for the client media player, the user preferences being set by a user of the host computer using the media management application. The client media player includes at least: a client input/output interface that provides connection with the host computer; at least one client data storage device that stores the client media assets and the user preferences, the user preferences being provided over the connection from the host computer; and a client media management application that presents one or more of the client media assets at the client media player in accordance with the user preferences.

Other aspects and embodiments of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF THE INVENTION

The invention relates to improved techniques for controlling operation of a portable electronic device. According to the invention, portable electronic devices which interact with a host electronic device can have their operational settings (e.g., configurations or preferences) remotely controlled. As a result, a host electronic device can offer a more sophisticated user interface and portable electronic devices need less local user interface features because these operational settings can be remotely controlled. The remotely-controlled (i.e., host controlled) operational settings are transferred to the portable electronic devices, whereby the portable electronic devices can thereafter operate in accordance with such settings.

Embodiments of the invention are discussed below with reference to FIGS. 1-7. However, those skilled in the art will readily appreciate that the detailed description given herein with respect to these figures is for explanatory purposes as the invention extends beyond these limited embodiments.

Figure 1:
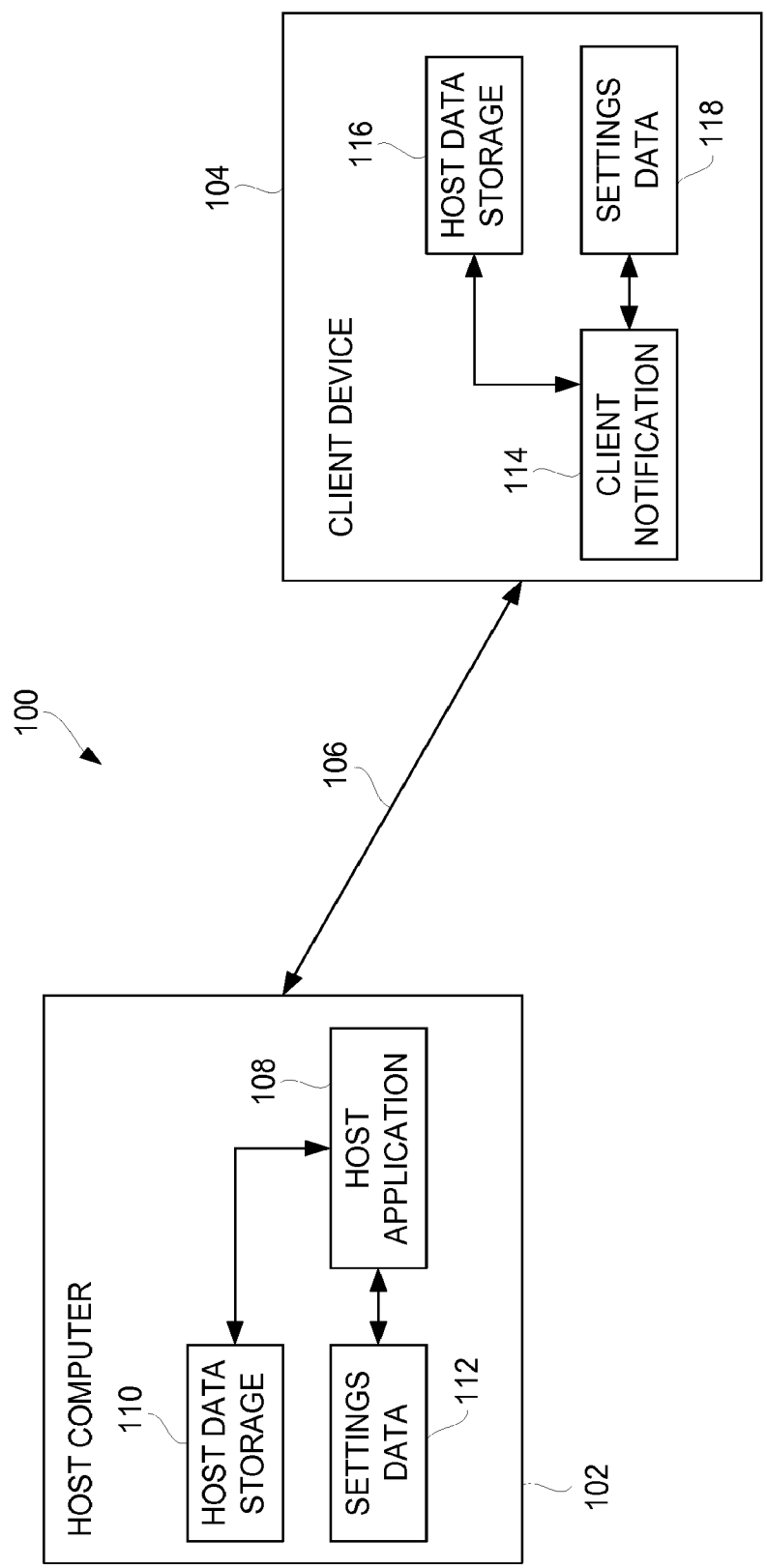
FIG. 1 is a block diagram of a settings management system according to one embodiment of the invention.

FIG. 1 is a block diagram of a settings management system 100 according to one embodiment of the invention. The settings management system 100 includes a host computer 102 and a client device 104. The host computer 102 is able to communicate with the client device 104 over a data link 106. The data link 106 can be provided over a wired network, a wireless network, or both.

The host computer 102 includes a host application 108. The host application 108 can represent an application program that is operable on the host computer 102. As an example, the host application 108 can be a media management application. One particular example of a media management application is iTunes® media management application provided by Apple Inc. The host computer 102, among other things, also includes a host data storage 110 and settings data 112. The host data storage 110 stores the data for the host computer 102. The data stored in the host data storage 110 is typically utilized by the host application 108. For example, when the host application 108 is or includes a media management application, the host data can pertain to media data, such as media data pertaining to media items. The settings data 112 can be managed by the host application 108. The settings data 112 pertains to data that controls or sets one or more operational settings on the client device 104. The operational settings, for example, can include user preferences or configurations. Operational settings can also be referred to as options. The settings data 112 is determined by the host application 108 in accordance with user interaction with the user interface provided by the host application 108.

The client device 104 is typically a highly portable electronic device. As an example, the client device 104 can be a hand-held computing device. More particularly, the client device 104 can be a hand-held media player. The client device 104 includes a client application 114. The client application 114 operates on the client device 104. The client application 114 can, for example, pertain to a media management application that enables the client device 104 to operate as a media player. The client application 114 makes use of client data storage 116 and settings data 118. The client data storage 116 stores data utilized by the client application 114. For example, when the client application 114 is a media management application, the client data being stored in the client data storage 116 can pertain to media data. The client application 114 also makes use of the settings data 118. In one embodiment, the settings data 118 are utilized by the client application 114 to control operational settings that are utilized by the client application 114.

The specific nature of the operational settings being set and utilized varies widely with different client devices. In an exemplary embodiment, such as where the host application 108 and the client application 114 are media management applications operating on a music player, the settings data can pertains to settings such as: shuffle settings, repeat settings, playback speed settings, equalization settings, sound check settings, clicker settings, language settings, menu configuration settings, etc.

Accordingly, a user of the host computer 102 is able to interact with the host application 108 using a user interface to set certain operational settings that will be applied to affect the operation of the client application 114 on the client device 104. In the event that the client device 104 has limited user interface capabilities, the ability to control operational settings (from the client device 104) to be utilized by the client device 104 can be severely hindered. Hence, enabling a user to remotely control operational settings for the client device 104 via a user interface made available at the host computer 102 is advantageous for a variety of reasons. One advantage of this approach is that the host computer 102 can offer an improved user interface that is often larger and more sophisticated than would otherwise be available on the client device 104. Another advantage of this approach is that the need for user interface features at the client device 104 is reduced, thereby allowing the client device 104 to be smaller, lighter and potentially less expensive.

The host computer 102 and the client device 104 can also be referred to as a host electronic device and a client electronic device, respectively. The client device 104 is normally a portable media device. In one embodiment, the form factor of the portable media device is hand-held or smaller. The portable media device may, for example, be small and lightweight enough to be carried in one hand, worn, or placed in a pocket.

To make client devices user-friendly, one approach is to limit the number of user controls. In one embodiment, a client device does not include a display screen. In such cases, the ability for a user of the client device to control settings (e.g., user preferences or other configurations) by way of making selections with respect to a display screen is not possible. With such client devices, the ability to enable users to set user preferences or configurations can be substantially limited. Consequently, the invention advantageously enables user preferences for a client device to be set at a host computer and then transferred to the client device.

Figure 2:
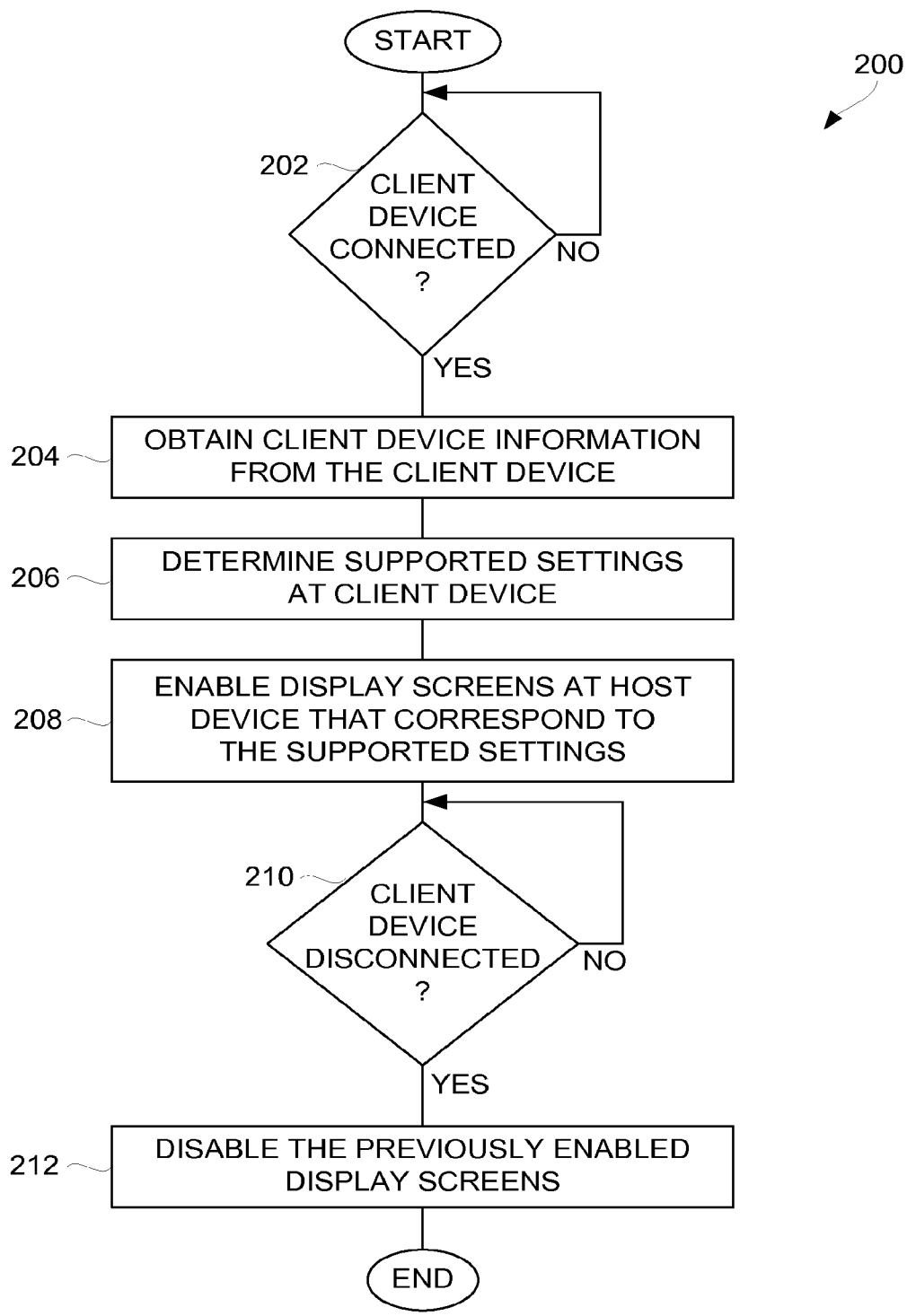
FIG. 2 is a flow diagram of a settings management process according to one embodiment of the invention.

FIG. 2 is a flow diagram of a settings management process 200 according to one embodiment of the invention. The settings management process 200 is, for example, performed by a host device, such as the host computer 102 illustrated in FIG. 1. More specifically, as an example, the host application 108 of the host computer 102 can perform the settings management process 200.

The settings management process 200 begins with a decision 202. The decision 202 determines whether a client device is connected to the host device. When the decision 202 determines that a client device is not connected to the host device, then the settings management process 200 awaits such a connection. In other words, the settings management process 200 can be deemed invoked once a client device is connected to the host device.

Accordingly, when the decision 202 determines that a client device is connected, the settings management process 200 continues. When the settings management process 200 continues, client device information is obtained 204 from the client device. Here, through communications between the host device and the client device, the host computer is able to obtain 204 the client device information that is provided by the client device. The client device information can pertain to various features available at the client device, whether software features or hardware features. The client device information can also include a type indication for the client device. The client device can also provide an identifier for the client device.

Next, the settings management process 200 determines 206 supported settings at the client device. The supported settings at the client device are those settings that the client device can recognize. Next, display screens at the host device are enabled 208. The display screens being enabled 208 are those display screens that correspond to the supported settings. In other words, the display screens that are enabled 208 are all part of a user interface provided at the host device and serves to enable a user of the host device to review or modify one or more operational settings that are supported by the client device.

Thereafter, a decision 210 determines whether the client device has been disconnected from the host device. When the decision 210 determines that the client device has not been disconnected but remains connected, the settings management process 200 continues to enable display of the display screens that correspond to the one or more operational settings that are supported by the client device. However, when the decision 210 determines that the client device has been disconnected, then the previously enabled display screens are disabled 212. Here, once the client device has been disconnected from the host device, the host device typically does not allow the settings for the client device to be modified. As a result, the display screens that would otherwise be utilized by a user of the host device to review and modify the supported operational settings are no longer accessible at the host device. Following the block 212, the settings management process 200 ends. However, in general, the settings management process 200 can be invoked whenever a client device is connected to the host device.

Although the settings management system 100 depicts only a single client device, it should be understood that the settings management system 100 can support a plurality of different client devices. In doing so, the host device 102 is able to individually manage the settings to be utilized by each of the different client devices. In one embodiment, for each of the client devices, a separate settings management process 200 can be invoked and utilized.

Figure 3:
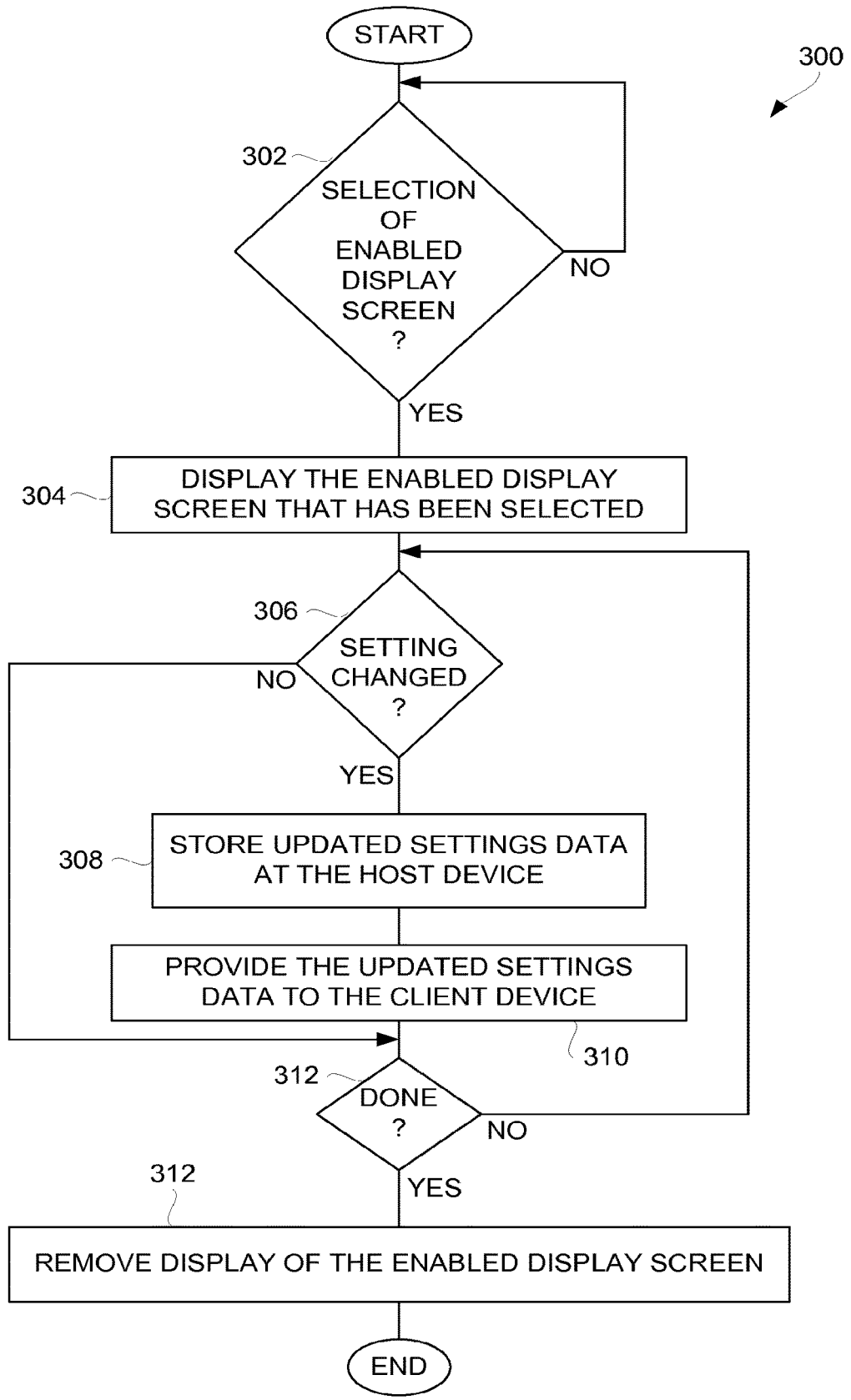
FIG. 3 is a flow diagram of a settings modification process according to one embodiment of the invention.

FIG. 3 is a flow diagram of a settings modification process 300 according to one embodiment of the invention. The settings modification process 300 is, for example, performed by a host device, such as the host computer 102 illustrated in FIG. 1.

The settings modification process 300 begins with a decision 302. The decision 302 determines whether a selection of an enabled display screen has been made. In other words, whether a user of the host device has requested to have the host device display a display screen that can be utilized to modify operational settings of a client device. In order for such a display screen to be presented, the display screen must be currently enabled as discussed above with regard to FIG. 2. For example, the client device must be connected to the host device. In any case, when the decision 302 determines that there has been no selection of an enabled display screen, the settings modification process 300 awaits such a selection. In other words, the settings modification process 300 is effectively invoked when a user has selected an enabled display screen to be presented on the host device.

Once the decision 302 determines that a selection of an enabled display screen has been made, the enabled display screen that has been selected is displayed 304. Next, a decision 306 determines whether the user has interacted with the enabled display screen to change one or more settings pertaining to operation of the client device. When the decision 306 determines that one or more settings have been changed, updated settings data is stored 308 at the host device. The updated settings data includes at least the settings data that has been changed. Typically, the host device will store all of the settings data. Hence, when certain settings data has been changed, the certain settings data is stored so as to replace the previously stored settings data corresponding thereto. Next, the updated settings data is provided 310 to the client device. Typically, the updated settings data is provided 310 to the client device over a data link, such as data link 106 illustrated in FIG. 1. As previously noted, the data link can pertain to a wired network, a wireless network or both. Here, the updated settings data provided 310 to the client device pertains to at least the settings that have been changed. Alternatively, all of the settings data can be provided 310 to the client device and thereby replace all of the settings data at the client device. On the other hand, when the decision 306 determines that the settings have not been changed, the settings modification process 300 bypasses the blocks 308 and 310.

After the updated settings data has been provided 310 to the client device (or after blocks 308 and 310 are bypassed), a decision 312 determines whether the settings modification process 300 is done. When the user has completed making any changes to settings data, the settings modification process 300 can be manually or automatically determined to be done. Regardless, when the decision 312 determines that the settings modification process 300 is not done, the settings modification process 300 returns to repeat the decision 306 and subsequent operations.

Once the decision 312 determines that the settings modification process 300 is done, then display of the enabled display screen is removed 314. Thereafter, the settings modification process 300 is complete and ends.

Figure 4A:
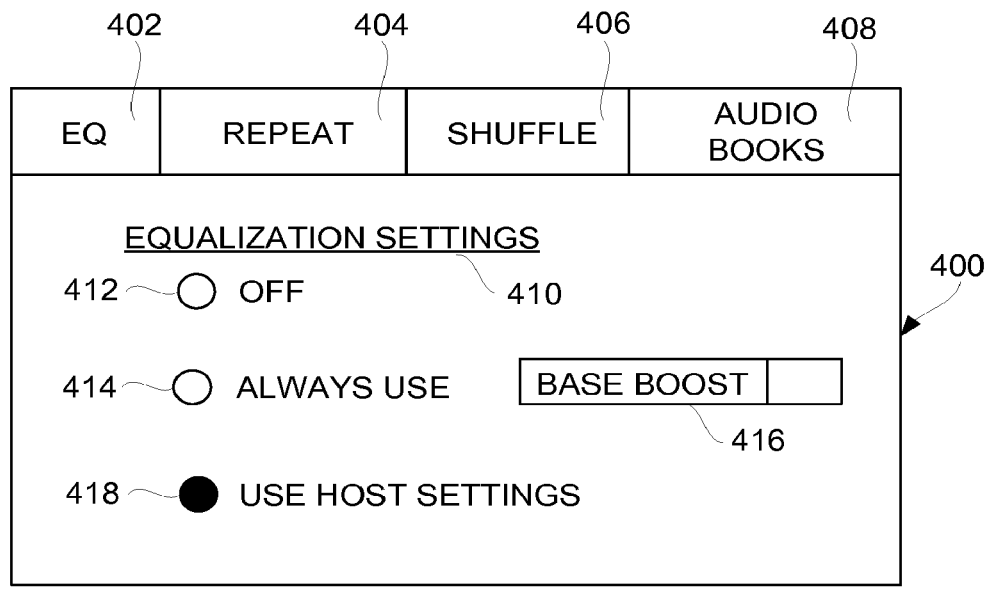
FIG. 4A is an exemplary diagram of a settings modification screen according to one embodiment of the invention.

FIG. 4A is an exemplary diagram of a settings modification screen 400 according to one embodiment of the invention. The settings modification screen 400 represents a display screen that can be utilized to modify operational settings of a client device (e.g., block 304 of FIG. 3). In this embodiment, the settings modification screen 400 pertains to a display screen provided by a media management application. The settings modification screen 400 includes tab selectors 402, 404, 406 and 408. The tab selector 402 pertains to equalization settings, the tab selector 404 pertains to repeat settings, the tab selector 406 pertains to shuffle settings, and the tab selector 408 pertains to audio books. As depicted in FIG. 4A, the settings modification screen 400 pertains to an equalization settings screen, since the tab selector 402 has been chosen. As such, the settings modification screen 400 depicts equalization settings 410. A user can thus interact with the settings modification screen 400 to make choices as to how a client device is to operate with regards to equalization. In this embodiment, the equalization settings 410 available on the settings modification screen 400 present a user with three choices for selection. The three choices can be selected by selectors 412, 414 and 418. The selector 412 allows a user to select "Off" if no equalization operations are desired at the client device. The selector 414 allows the user to select "Always Use" to utilize a predetermined equalization setting. A selector 416 allows the user to select one of a plurality of preset equalization settings to be used as the predetermined equalization setting in the case where the selector 414 is selected. In the example illustrated in FIG. 4A, the selected predetermined equalization setting is known as "Bass Boost". The selector 418 allows the user to select "Use Host Settings" to utilize host equalization settings. For example, with respect to FIG. 1, the host application 108 can allow a user of the host computer 102 to set equalization settings for media items available at the host computer 102. The selection of the selector 418 indicates that the user desires to utilize the same equalization settings automatically on the client device 104. In such case, the equalization settings can be set in a variety of different ways at the host computer 102. For example, for any type of genre, artist, album or media item (e.g., song, video, etc.), the equalization settings can be separately determined.

Figure 4B:
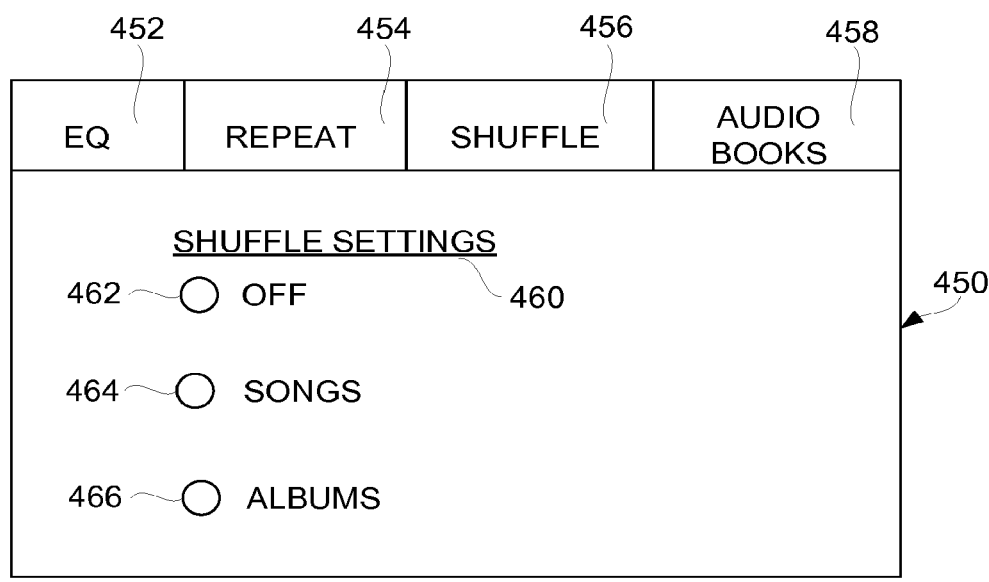
FIG. 4B is an exemplary diagram of another settings modification screen according to one embodiment of the invention.

FIG. 4B is an exemplary diagram of another settings modification screen 450 according to one embodiment of the invention. The settings modification screen 450 represents a display screen that can be utilized to modify operational settings of a client device (e.g., block 304 of FIG. 3). In this embodiment, the settings modification screen 450 pertains to a display screen provided by a media management application. The settings modification screen 450 includes tab selectors 452, 454, 456 and 458. The tab selector 452 pertains to equalization settings, the tab selector 454 pertains to repeat settings, the tab selector 456 pertains to shuffle settings, and the tab selector 458 pertains to audio books. As depicted in FIG. 4B, the settings modification screen 450 pertains to a shuffle settings 460, since the tab selector 456 has been chosen. The shuffle settings 460 allows the user to indicate whether and what type of shuffle they desire to be utilized with the client device. In this example, the user is presented with three options for shuffle settings 460. The first settings option is "Off" and corresponds to a selector 462. When selected, the client device would not provide any shuffle operation. The second settings option is "Songs" and corresponds to a selector 464. When selected, the client device would shuffle a play order of songs on a song basis after playing through all (or a playlist of) the songs. The third settings option is "Albums" and corresponds to a selector 466. When selected, the client device would shuffle a play order of songs on an album basis (e.g., after playing all the songs within an album).

Figure 5:
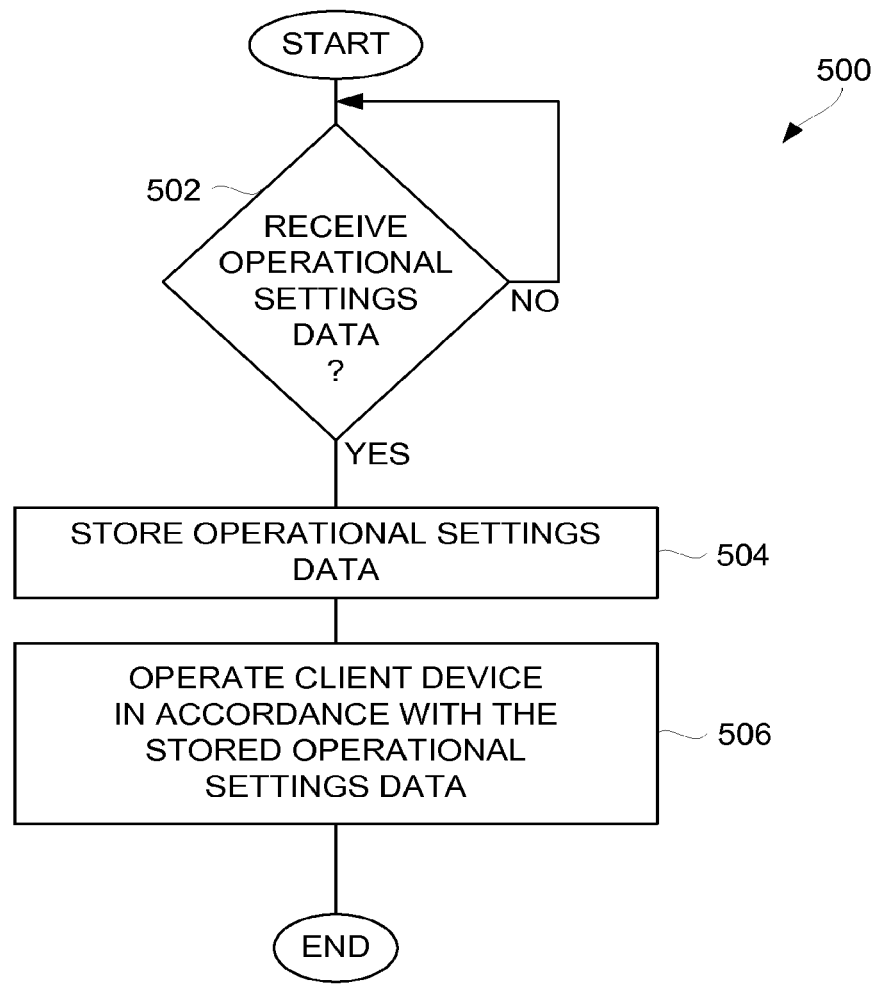
FIG. 5 is a flow diagram of a settings utilization process according to one embodiment of the invention.

FIG. 5 is a flow diagram of a settings utilization process 500 according to one embodiment of the invention. The settings utilization process 500 is, for example, performed by a client device, such as the client device 104 illustrated in FIG. 1. More specifically, as an example, the client application 114 of the client computer 104 can perform the settings utilization process 500. In one example, the client application is a media management application.

The settings utilization process 500 begins with a decision 502. The decision 502 determines whether operational settings data has been received 502. As noted above with respect to the settings modification process 300 illustrated in FIG. 3, operational settings data can be set at a host computer and transferred to a client device. For example, in FIG. 3, updated settings data can be provided 310 to the client device. In any case, when the decision 502 determines that operational settings data has not been received, then the settings utilization process 500 awaits such data.

Once the decision 502 determines that operational settings data has been received, the operational settings data is stored 504 at the client device. As noted above in FIG. 1, the client device can include data storage, such as the client data storage 116. Thereafter, the client device can be operated 506 in the normal course in accordance with the stored operational settings data. In other words, the client device can make use of operational settings data that has been set at a host computer, yet utilized on the client computer. For example, although the operational settings data is remotely determined and then provided to the client device, the client device can make use of the operational settings data as if it had been provided locally. In one embodiment, all or substantially all of the available operational settings for the client device can be set at the host computer. In another embodiment, some operational settings can be remotely set at the host computer, while other operational settings can be sent at the client device. In still another embodiment, some or all of the operational settings can be set at either the host computer or the client device. Following the block 506, the settings utilization process 500 is complete and ends.

Figure 6:
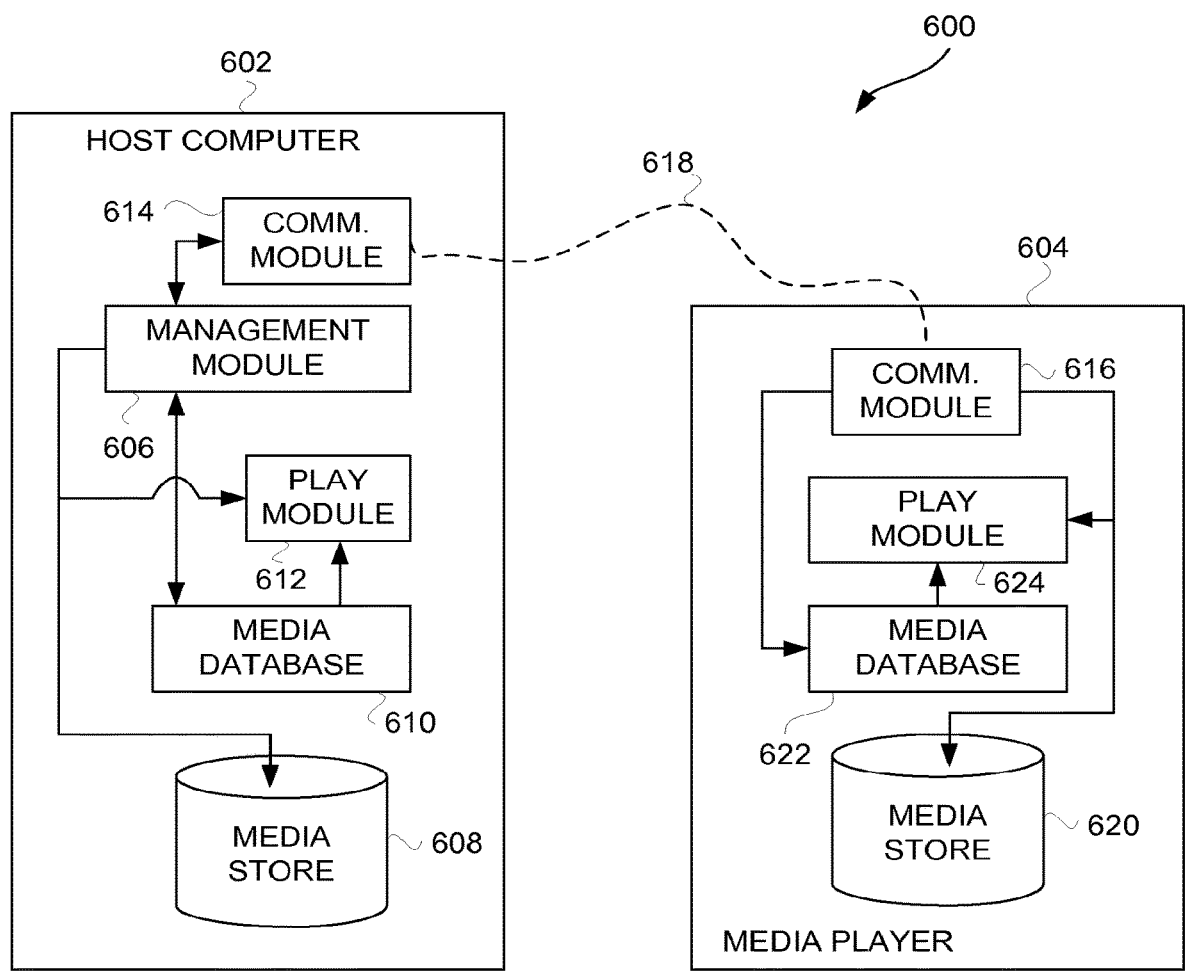
FIG. 6 is a block diagram of a media management system according to one embodiment of the invention.

FIG. 6 is a block diagram of a media management system 600 according to one embodiment of the invention. The media management system 600 includes a host computer 602 and a media player 604. The host computer 602 is, for example, an implementation of the host computer 102 illustrated in FIG. 1. The media player 604 is, for example, an implementation of the client device 104 illustrated in FIG. 1. The host computer 602, among other conventional components, includes a management module 606 which is a software module. The management module 606 provides for centralized management of media items (and/or playlists) not only on the host computer 602 but also on the media player 604. More particularly, the management module 606 manages those media items stored in a media store 608 associated with the host computer 602. The management module 606 also interacts with a media database 610 to store media information associated with the media items stored in the media store 608.

The media information pertains to characteristics or attributes of the media items. For example, in the case of audio or audiovisual media, the media information can include one or more of: title, album, track, artist, composer and genre. These types of media information are specific to particular media items. In addition, the media information can pertain to quality characteristics of the media items. Examples of quality characteristics of media items can include one or more of: bit rate, sample rate, equalizer setting, volume adjustment, start/stop and total time.

Still further, the host computer 602 includes a play module 612. The play module 612 is a software module that can be utilized to play certain media items stored in the media store 608. The play module 612 can also display (on a display screen) or otherwise utilize media information from the media database 610. Typically, the media information of interest corresponds to the media items to be played by the play module 612.

The host computer 602 also includes a communication module 614 that couples to a corresponding communication module 616 within the media player 604. A connection or link 618 removably couples the communication modules 614 and 616. In one embodiment, the connection or link 618 is a cable that provides a data bus, such as a FIREWIRE™ bus or USB bus, which is well known in the art. In another embodiment, the connection or link 618 is a wireless channel or connection through a wireless network. Hence, depending on implementation, the communication modules 614 and 616 may communicate in a wired or wireless manner.

The management module 606 can also operate to set operational settings for use on the media player 604. The settings management processing 200 and the settings modification process 300 are examples of processing that might be utilized in this regard. The operational settings (or operational settings data) for use with the client device can be set and then stored on the host computer 602. At the host computer 602, the operational settings (or operational settings data) can, for example, be stored in the media store 608, the media database 610 or other storage. The management module 606 and/or the communication module 614 can also operate to transfer the operational settings (or operational settings data) to the media player 604.

The media player 604 also includes a media store 620 that stores media items within the media player 604. Optionally, the media store 620 can also store data, i.e., non-media item storage. The media items being stored to the media store 620 are typically received over the connection or link 618 from the host computer 602. More particularly, the management module 606 sends all or certain of those media items residing on the media store 608 over the connection or link 618 to the media store 620 within the media player 604. Additionally, the corresponding media information for the media items that is also delivered to the media player 604 from the host computer 602 can be stored in a media database 622. In this regard, certain media information from the media database 610 within the host computer 602 can be sent to the media database 622 within the media player 604 over the connection or link 618. Still further, playlists identifying certain of the media items can also be sent by the management module 606 over the connection or link 618 to the media store 620 or the media database 622 within the media player 604.

Furthermore, the media player 604 includes a play module 624 that couples to the media store 620 and the media database 622. The play module 624 is a software module that can be utilized to play certain media items stored in the media store 620. The play module 624 can also display (on a display screen) or otherwise utilize media information from the media database 622. Typically, the media information of interest corresponds to the media items to be played by the play module 624.

In one embodiment, the media player 604 has limited or no capability to manage media items on the media player 604. However, the management module 606 within the host computer 602 can indirectly manage the media items residing on the media player 604. For example, to "add" a media item to the media player 604, the management module 606 serves to identify the media item to be added to the media player 604 from the media store 608 and then causes the identified media item to be delivered to the media player 604. As another example, to "delete" a media item from the media player 604, the management module 606 serves to identify the media item to be deleted from the media store 608 and then causes the identified media item to be deleted from the media player 604. As still another example, if changes (i.e., alterations) to characteristics of a media item were made at the host computer 602 using the management module 606, then such characteristics can also be carried over to the corresponding media item on the media player 604. In one implementation, the additions, deletions and/or changes occur in a batch-like process during synchronization of the media items on the media player 604 with the media items on the host computer 602.

In another embodiment, the media player 604 has limited or no capability to manage playlists on the media player 604. However, the management module 606 within the host computer 602 through management of the playlists residing on the host computer can indirectly manage the playlists residing on the media player 604. In this regard, additions, deletions or changes to playlists can be performed on the host computer 602 and then be carried over to the media player 604 when delivered thereto.

At the media player 604, the operational settings (or operational settings data) can be received by the communication module 616 and then stored in the media store 620, the media database 622 or other storage. Thereafter, the media player 604, e.g., the play module 624, can utilize the operational settings (or operational settings data) when operating. Optionally, the media player 604 can also enable a user to directly set one or more operational settings. Hence, some operational settings can be set at the host computer 602 and provided to the media player 604, while other operational settings can be set locally at the media player 604. In one embodiment, the media player 604 enables a user to override or alter the operational settings provided by the host computer.

The ability to remotely set operational settings at the host computer 602 and then provide them to the media player 604 can be restricted so as to prevent data exchange when the host computer and media player do not recognize one another.

According to one embodiment, when a media player is first connected to a host computer (or even more generally when matching identifiers are not present), the user of the media player is queried as to whether the user desires to affiliate, assign or lock the media player to the host computer. When the user of the media player elects to affiliate, assign or lock the media player with the host computer, then a pseudo-random identifier is obtained and stored in either the media database or a file within both the host computer and the media player. In one implementation, the identifier is an identifier associated with (e.g., known or generated by) the host computer or its management module and such identifier is sent to and stored in the media player. In another implementation, the identifier is associated with (e.g., known or generated by) the media player and is sent to and stored in a file or media database of the host computer.

Figure 7:
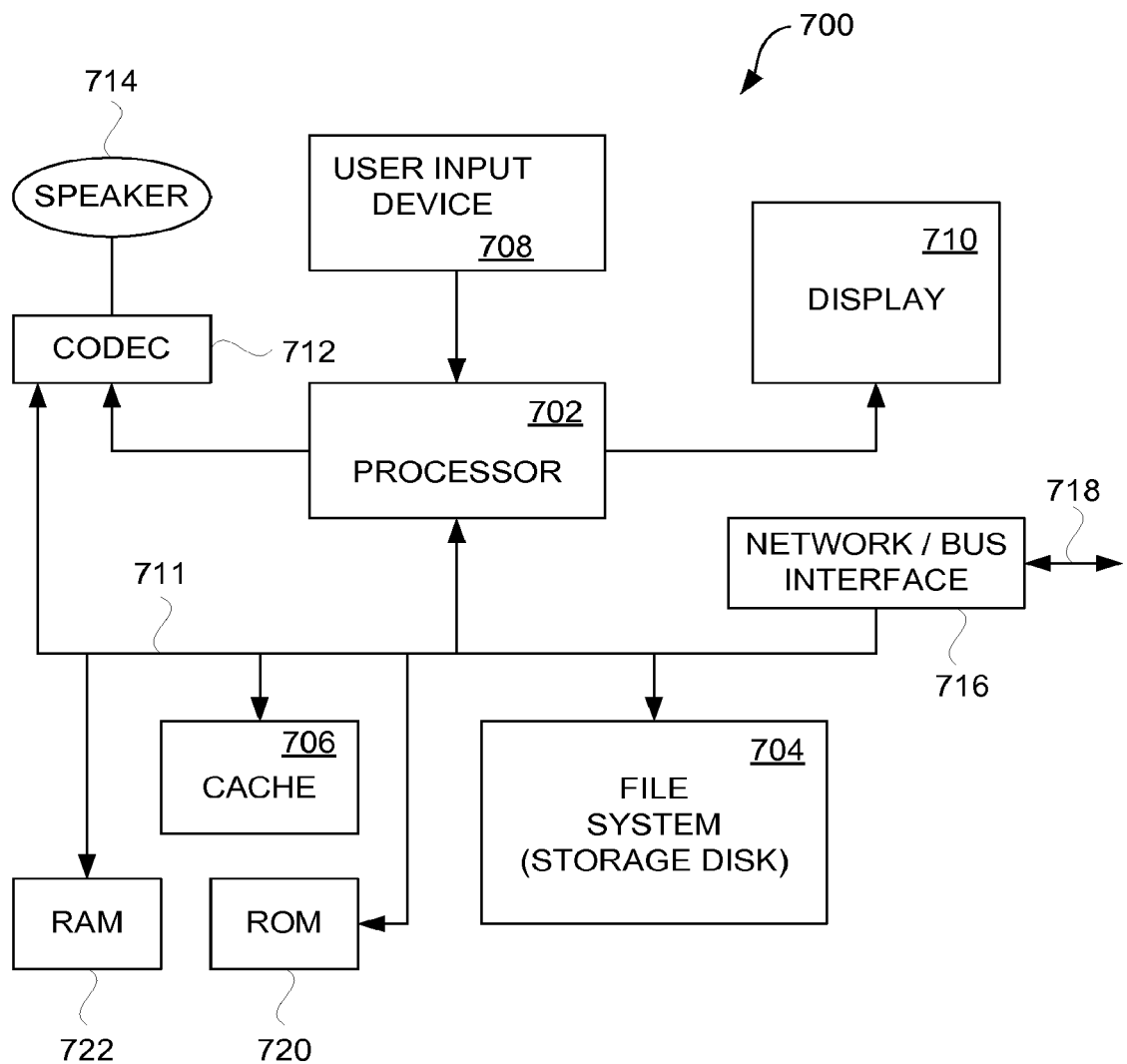
FIG. 7 is a block diagram of a media player according to one embodiment of the invention.

FIG. 7 is a block diagram of a media player 700 according to one embodiment of the invention. The media player 700 includes a processor 702 that pertains to a microprocessor or controller for controlling the overall operation of the media player 700. The media player 700 stores media data pertaining to media items in a file system 704 and a cache 706. The file system 704 is, typically, a storage disk or a plurality of disks. The file system 704 typically provides high capacity storage capability for the media player 700. The file system 704 can store not only media data but also non-media data (e.g., when operated in a disk mode). However, since the access time to the file system 704 is relatively slow, the media player 700 can also include a cache 706. The cache 706 is, for example, Random-Access Memory (RAM) provided by semiconductor memory. The relative access time to the cache 706 is substantially shorter than for the file system 704. However, the cache 706 does not have the large storage capacity of the file system 704. Further, the file system 704, when active, consumes more power than does the cache 706. The power consumption is often a concern when the media player 700 is a portable media player that is powered by a battery (not shown). The media player 700 also includes a RAM 720 and a Read-Only Memory (ROM) 722. The ROM 722 can store programs, utilities or processes to be executed in a non-volatile manner. The RAM 720 provides volatile data storage, such as for the cache 706.

The media player 700 also includes a user input device 708 that allows a user of the media player 700 to interact with the media player 700. For example, the user input device 708 can take a variety of forms, such as a button, keypad, dial, etc. Still further, the media player 700 includes a display 710 (screen display) that can be controlled by the processor 702 to display information to the user. A data bus 711 can facilitate data transfer between at least the file system 704, the cache 706, the processor 702, and the CODEC 712.

In one embodiment, the media player 700 serves to store a plurality of media items (e.g., songs) in the file system 704. When a user desires to have the media player play a particular media item, a list of available media items is displayed on the display 710. Then, using the user input device 708, a user can select one of the available media items. The processor 702, upon receiving a selection of a particular media item, supplies the media data (e.g., audio file) for the particular media item to a coder/decoder (CODEC) 712. The CODEC 712 then produces analog output signals for a speaker 714. The speaker 714 can be a speaker internal to the media player 700 or external to the media player 700. For example, headphones or earphones that connect to the media player 700 would be considered an external speaker.

The media player 700 also includes a network/bus interface 716 that couples to a data link 718. The data link 718 allows the media player 700 to couple to a host computer.

The data link 718 can be provided over a wired connection or a wireless connection. In the case of a wireless connection, the network/bus interface 716 can include a wireless transceiver.

The media items (or media assets) can be audio items (e.g., audio files or songs), videos (e.g., movies) or images (e.g., photos).

In one embodiment, the client device/media player is a portable media device dedicated to processing media such as audio, video and/or images. For example, the media device can be a music player (e.g., MP3 player), a game player, a video player, a video recorder, a camera, an image viewer and the like. These devices are generally battery operated and highly portable so as to allow a user to listen to music, play games or video, record video, play video, take pictures or view pictures wherever the user travels. In one implementation, the media device is a hand-held device that is sized for placement into a pocket or hand of the user. By being hand-held, the media device is relatively small and easily handled and utilized by its user. By being pocket sized, the user does not have to directly carry the media device and therefore the media device can be taken almost anywhere the user travels. Furthermore, the media device may be operated by the user's hands without the need for a reference surface such as a desktop.

In general, the media player can correspond to one or more of: a music player, game player, video player, camera, mobile telephone (e.g., cell phone), personal digital assistant (PDA), and/or the like.

U.S. application Ser. No. 11/535,646, (now U.S. Pat. No. 7,706,637) filed Sep. 27, 2006, and entitled "HOST CONFIGURED FOR INTEROPERATION WITH COUPLED PORTABLE MEDIA PLAYER DEVICE," is hereby incorporated herein by reference. U.S. application Ser. No. 10/973,925, (now U.S. Pat. No. 7,680,849) filed Oct. 25, 2004, and entitled "MULTIPLE MEDIA TYPE SYNCHRONIZATION BETWEEN HOST COMPUTER AND MEDIA DEVICE," is hereby incorporated herein by reference.

The various aspects, embodiments, implementations or features of the invention can be used separately or in any combination.

The invention is preferably implemented by software, but can also be implemented in hardware or a combination of hardware and software. The invention can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, optical data storage devices, and carrier waves. The computer readable medium can also be distributed over network-coupled computer systems so that the computer readable code is stored and executed in a distributed fashion.

The advantages of the invention are numerous. Different aspects, embodiments or implementations may yield one or more of the following advantages. One advantage of the invention is that operational settings to be utilized by a client device (e.g., portable media device) can be remotely set at a host computer. This avoids or reduces the need for the client device to support user interaction to set such operational settings. A host computer can also offer a user interface for controlling operational settings that is often larger and more sophisticated than would otherwise be available on a client device.

The many features and advantages of the present invention are apparent from the written description and, thus, it is intended by the appended claims to cover all such features and advantages of the invention. Further, since numerous modifications and changes will readily occur to those skilled in the art, the invention should not be limited to the exact construction and operation as illustrated and described. Hence, all suitable modifications and equivalents may be resorted to as falling within the scope of the invention.

The invention claimed is:

1. A host device comprising:
   a communications interface establishing a communicative coupling between the host device and a client device storing media including video and client device information; and
   at least one processor to:
   in response to a determination that data exchange between the host device and the client device is enabled, generate, at the host device, a user-interface configured to display and alter client settings, the client settings corresponding to operational settings supported by the client device, wherein the client device includes a user-interface configured to alter fewer of the client settings with respect to the user-interface of the host device, wherein the client settings are configurations or preferences of the client device;
   present, on the user-interface of the host device, an operational interface element for adjusting the client settings that are supported by the client device;
   receive, at the operational interface element, a user selection of an option to copy at least one host operational setting in use at the host device to the client device, wherein the at least one host operational setting corresponds to at least one of the client settings that is alterable via the host device, but is not alterable via the user-interface of the client device; and
   send the at least one host operational setting to the client device via the communicative coupling, the at least one host operational setting causing the client device to run using the at least one host operational setting on the client device.

2. The host device of claim 1, wherein the communication interface is further configured to terminate the communicative coupling once the host device has determined that the client device is persistently running using the at least one host operational setting.

3. The host device of claim 1, wherein the communication interface is further configured to receive the client device information from the client device, and wherein the at least one processor is further configured to identify the operational settings that are supported by the client device based on the client device information.

4. The host device of claim 3, wherein the client device information pertains to software features available at the client device, hardware features available at the client device, a type indication for the client device, or a combination thereof.

5. The host device of claim 1, wherein the at least one host operational includes at least one of equalizer settings, shuffle settings, and menu configuration settings.

6. The host device of claim 1, wherein the option to copy the at least one host operational setting in use at the host device to the client device corresponds to an option to copy at least one equalization setting in use at the host device to the client device.

7. The host device of claim 1, wherein the at least one processor is further configured to:
   generate and store a host identifier at the host device; and
   transmit the host identifier for storage at the client device.

8. The host device of claim 7, wherein the host identifier is generated in response to receiving a request, from the client device, to lock the client device to the host device.

9. A non-transitory computer-readable storage medium storing instructions that, when executed by one or more computer processors of a host device, cause the host device to:
   in response to a determination that data exchange between the host device and a client device is enabled, generate, at the host device, a user-interface configured to display and alter client settings, the client settings corresponding to operational settings supported by the client device, wherein the client device includes a user-interface configured to alter fewer of the client settings with respect to the user-interface of the host device, wherein the client settings are configurations or preferences of the client device, the client device storing media including video and client device information;
   present, on the user-interface of the host device, an operational interface element for adjusting the client settings that are supported by the client device;
   receive, at the operational interface element, a user selection of an option to copy at least one host operational setting in use at the host device to the client device, wherein the at least one host operational setting corresponds to at least one of the client settings that is alterable via the host device, but is not alterable via the user-interface of the client device;
   establish a communication link between the host device and the client device by the host device; and
   send the at least one host operational setting on the client device over the communication link, the at least one host operational setting causing the client device to run using the at least one host operational setting.

10. The non-transitory computer-readable storage medium of claim 9, the instructions further causing the host device to:
    receive the client device information from the client device; and
    identify the operational settings that are supported by the client device based on the client device information.

11. The non-transitory computer-readable storage medium of claim 10, wherein the client device information pertains to software features available at the client device.

12. The non-transitory computer-readable storage medium of claim 10, wherein the client device information pertains to hardware features available at the client device.

13. The non-transitory computer-readable storage medium of claim 10, wherein the client device information includes a type indication for the client device.

14. The non-transitory computer-readable storage medium of claim 9, wherein the at least one host operational setting includes at least one of equalizer settings, shuffle settings, and menu configuration settings.

15. A method for remotely providing operational settings from a host device to a client device comprising:
    in response to determining that data exchange between the host device and the client device is enabled, generating, at the host device, a host interface configured to display and alter client settings, the client settings corresponding to operational settings supported by the client device, wherein the client device includes a user-interface configured to alter fewer of the client settings with respect to the host interface of the host device, wherein the client settings are configurations or preferences of the client device, the client device storing media including video and client device information;

displaying, in a host interface, an operational interface element for adjusting the client settings supported by the client device;

receiving, at the host device, a selection of an option to copy at least one host operational in use at the host device to the client device, wherein the at least one host operational setting corresponds to at least on of the client settings that is alterable via the host device, but is not alterable via the user-interface on the client device;

establishing a communication link between the host device and the client device by the host device; and sending the at least one host operational setting to the client device over the communication link, thereby causing the client device to run using the at least one host operational setting.

16. The method of claim 15, wherein the supported operational settings include at least one of equalizer settings, shuffle settings, and menu configuration settings.

17. A system for controlling a multimedia client device comprising:

a client device storing digital media including multimedia content and client device information; and a host device in operable communication with the client device, the host device including at least one processor to:

in response to a determination that data exchange between the host device and the client device is enabled, generate and present user-interface elements for selecting client settings, the client settings corresponding to operational settings that affect operations of the client device, wherein the operational settings are not definable using a user-interface of the client device and are configurations or preferences of the client device;

receive, at the user-interface elements, a selection of an option to copy at least one host operational setting in use at the host device to the client device, wherein the at least one host operational setting corresponds to at least one of the client settings that is alterable via the host device, but is not alterable via the user-interface of the client device; and transmit the at least one host operational setting to the client device, via a communication coupling, thereby causing the client device to operate in accordance with the at least one host operational setting.

18. The system of claim 17, wherein the multimedia content includes audio and video, wherein the client device information defines software or hardware features available at the client device and wherein the processor is further configured to:

determine an operational setting supported by the client device based on the software or hardware features defined in the client device information, the operational setting recognizable by the client device; and wherein the user-interface elements are generated and presented based on the operational setting supported by the client device.

19. The system of claim 17, wherein the at least one host operational setting includes at least one of equalizer settings, shuffle settings, and menu configuration settings.

* * * * *